United States Patent
Park et al.

(10) Patent No.: US 9,588,578 B2
(45) Date of Patent: Mar. 7, 2017

(54) METHOD OF CHANGING AN OPERATING FREQUENCY FOR PERFORMING A DYNAMIC VOLTAGE AND FREQUENCY SCALING, SYSTEM ON-CHIP, AND MOBILE DEVICE HAVING THE SAME

(71) Applicant: SAMSUNG ELECTRONICS CO., LTD., Suwon-si, Gyeonggi-Do (KR)

(72) Inventors: Jong-Lae Park, Anyang-si (KR); Hwang-Sub Lee, Anyang-si (KR); Hee-Myung Noh, Yongin-si (KR); Dong-Jin Kim, Seoul (KR); Seung-Geun Lee, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 172 days.

(21) Appl. No.: 14/532,649

(22) Filed: Nov. 4, 2014

(65) Prior Publication Data

US 2015/0134982 A1    May 14, 2015

(30) Foreign Application Priority Data

Nov. 11, 2013   (KR) .................... 10-2013-0136159

(51) Int. Cl.
*G01R 31/30* (2006.01)
*G06F 1/00* (2006.01)
(Continued)

(52) U.S. Cl.
CPC ............ *G06F 1/3296* (2013.01); *G06F 1/324* (2013.01); *Y02B 60/1217* (2013.01); *Y02B 60/1285* (2013.01)

(58) Field of Classification Search
CPC ........ G06F 1/324; G06F 1/3296; G06F 1/203; G06F 1/3278; G06F 1/325; Y02B 60/1217; Y02B 60/121; Y02B 60/1207; Y02B 60/1203; Y02B 60/12; Y02B 60/10; Y02B 60/1285
(Continued)

(56) References Cited

U.S. PATENT DOCUMENTS 5,721,809 A    2/1998  Park
5,758,030 A    5/1998  Nakajima
(Continued)

FOREIGN PATENT DOCUMENTS

KR    10-0138694    2/1998
KR    10-0156152    7/1998
(Continued)

*Primary Examiner* — Christine Tu
(74) *Attorney, Agent, or Firm* — F. Chau & Associates, LLC

(57) ABSTRACT

A method of changing an operating frequency for performing a dynamic voltage and frequency scaling on a central processing unit included in a system on-chip is provided. A previous maximum peak workload of the central processing unit is detected in a history period of the dynamic voltage and frequency scaling when the operating frequency of the central processing unit is determined to be increased, and an increased operating frequency is applied to the central processing unit. The increased operating frequency is calculated based on the previous maximum peak workload of the central processing unit.

20 Claims, 18 Drawing Sheets

(51) Int. Cl.
*G06F 1/26* (2006.01)
*G06F 1/32* (2006.01)

(58) Field of Classification Search
USPC .... 713/320, 300, 322, 400; 714/745, 10, 11, 714/14, 21, 22, 37, 47.1, 47.2
See application file for complete search history.

(56) References Cited

U.S. PATENT DOCUMENTS

| | | |
|---|---|---|
| 7,562,234 B2 | 7/2009 | Conroy et al. |
| 8,250,395 B2 | 8/2012 | Carter et al. |
| 8,473,768 B2 | 6/2013 | Kim et al. |
| 8,589,718 B2 * | 11/2013 | Lin ...................... G06F 1/3203 |
| | | 713/300 |
| 8,924,753 B2 * | 12/2014 | Park ...................... G06F 1/3215 |
| | | 710/110 |
| 2009/0049314 A1 | 2/2009 | Taha et al. |
| 2011/0239006 A1 | 9/2011 | Hsu et al. |
| 2012/0066526 A1 | 3/2012 | Salsbery et al. |
| 2013/0311792 A1* | 11/2013 | Ponnathota ............... G06F 1/26 |
| | | 713/300 |
| 2014/0068285 A1* | 3/2014 | Lee ........................ G06F 1/324 |
| | | 713/300 |

FOREIGN PATENT DOCUMENTS

| | | |
|---|---|---|
| KR | 10-2006-0102659 | 9/2006 |
| KR | 10-2010-0046414 | 5/2010 |
| KR | 10-2011-0055041 | 5/2011 |

\* cited by examiner

METHOD OF CHANGING AN OPERATING FREQUENCY FOR PERFORMING A DYNAMIC VOLTAGE AND FREQUENCY SCALING, SYSTEM ON-CHIP, AND MOBILE DEVICE HAVING THE SAME

CROSS-REFERENCE TO RELATED APPLICATION

This application claims priority under 35 USC §119 to Korean Patent Applications No. 10-2013-0136159, filed on Nov. 11, 2013 in the Korean Intellectual Property Office (KIPO), the contents of which are incorporated by reference herein in its entirety.

TECHNICAL FIELD

The present disclosure relates to dynamic voltage and frequency scaling (DVFS), and more particularly, to a method of changing an operating frequency for performing a dynamic voltage and frequency scaling, a system on-chip, and a mobile device having the system on-chip.

DISCUSSION OF THE RELATED ART

Mobile devices may include an application processor for controlling the operations of at least one function module included in the mobile device. The application processor may be implemented by a system on-chip (SOC). Generally, since the mobile device operates on power supplied by a battery, the application processor and the function module of the mobile device are required to consume low power. Dynamic voltage and frequency scaling (DVFS) techniques may be used by the application processor to reduce power consumption. The dynamic voltage and frequency scaling techniques may be used to anticipate an operating state of a central processing unit (CPU) included in the application processor, and dynamically change an operating frequency and an operating voltage of the central processing unit based on the anticipated operating state. Here, a trade-off relationship exists between performance (e.g., operating frequency and operating voltage) and power consumption of the central processing unit. Since the operating voltage follows the operating frequency (e.g., the operating voltage increases as the operating frequency increases, and the operating voltage decreases as the operating frequency decreases) in the central processing unit, the central processing unit may avoid consuming an unnecessary amount of power when the operating frequency of the central processing unit is efficiently changed. However, when the dynamic voltage and frequency scaling technique is practically applied to the application processor, the operating frequency of the central processing unit included in the application processor might be inefficiently changed, and thereby the central processing unit may consume an unnecessarily large amount of power in the application processor.

SUMMARY

Exemplary embodiments provide a method for efficiently changing an operating frequency of a central processing unit by allowing for previous peak workloads of the central processing unit when the operating frequency of the central processing unit is increased by a dynamic voltage and frequency scaling that is performed on the central processing unit.

Exemplary embodiments provide a system on-chip capable of efficiently changing an operating frequency of a central processing unit by allowing for previous peak workloads of the central processing unit when the operating frequency of the central processing unit is increased by a dynamic voltage and frequency scaling that is performed on the central processing unit.

Exemplary embodiments provide a mobile device that includes the system on-chip (e.g., an application processor).

According to some exemplary embodiments, a method of changing an operating frequency for performing a dynamic voltage and frequency scaling on a central processing unit included in a system on-chip may include an operation of detecting a previous maximum peak workload of the central processing unit in a history period of the dynamic voltage and frequency scaling when the operating frequency of the central processing unit is determined to be increased, and an operation of applying an increased operating frequency to the central processing unit, the increased operating frequency being calculated based on the previous maximum peak workload of the central processing unit.

According to exemplary embodiments, the method may further include an operation of applying a maximum operating frequency of the central processing unit to the central processing unit when the previous maximum peak workload of the central processing unit is not detected in the history period.

According to exemplary embodiments, the history period may be between a first timing point and a second timing point. The second timing point may be a timing point where the operating frequency of the central processing unit is determined to be increased. The first timing point may be a timing point that is prior to the second timing point by a predetermined time.

According to exemplary embodiments, the operating frequency of the central processing unit may be increased when a workload ratio of the central processing unit is higher than a predetermined upper limit. The operating frequency of the central processing unit may be decreased when the workload ratio of the central processing unit is lower than a predetermined lower limit. The operating frequency of the central processing unit may be maintained when the workload ratio of the central processing unit is between the predetermined upper limit and the predetermined lower limit.

According to exemplary embodiments, a maximum value of previous peak workloads of the central processing unit may be determined to be the previous maximum peak workload of the central processing unit when the previous peak workloads at previous timing points where the operating frequency of the central processing unit was increased are detected in the history period.

According to exemplary embodiments, the increased operating frequency may be calculated based on [Equation 1] below, $$f = C \times \text{Max(Load)} \quad \text{[Equation 1]}$$

(Here, Pf denotes the increased operating frequency, C denotes a balance constant between performance and power consumption of the central processing unit, and Max(Load) denotes the previous maximum peak workload of the central processing unit.).

According to exemplary embodiments, the increased operating frequency may be adjusted based on [Equation 2] below, $$CPf = K \times Pf \quad \text{[Equation 2]}$$

(Here, CPf denotes an adjusted operating frequency, Pf denotes the increased operating frequency, and K denotes a tendency adjustment constant.).

According to exemplary embodiments, the system on-chip may correspond to an application processor included in a mobile device.

According exemplary embodiments, a system on-chip may include at least one intellectual property unit. A central processing unit may be configured to operate based on a clock signal. A clock signal generating unit may be configured to generate the clock signal. A monitoring unit may be configured to monitor a workload of the central processing unit. A clock signal management unit may be configured to increase an operating frequency of the central processing unit corresponding to a frequency of the clock signal when a workload ratio of the central processing unit is higher than a predetermined upper limit, to decrease the operating frequency of the central processing unit when the workload ratio of the central processing unit is lower than a predetermined lower limit, and to maintain the operating frequency of the central processing unit when the workload ratio of the central processing unit is between the predetermined upper limit and the predetermined lower limit. A history buffer unit may be configured to store previous peak workloads of the central processing unit at previous timing points where the operating frequency of the central processing unit was increased. Here, the clock signal management unit may detect a previous maximum peak workload of the central processing unit in the history buffer unit, and may apply an increased operating frequency to the central processing unit when the clock signal management unit increases the operating frequency of the central processing unit, the increased operating frequency being calculated based on the previous maximum peak workload of the central processing unit.

According to exemplary embodiments, the clock signal management unit may apply a maximum operating frequency of the central processing unit to the central processing unit when the previous maximum peak workload of the central processing unit is not detected in the history buffer unit.

According to exemplary embodiments, the history buffer unit may be implemented as a queue having a predetermined capacity, and the history buffer unit may operate in a first-in first-out (FIFO) manner.

According to exemplary embodiments, the history buffer unit may store data indicating 'not-available' instead of workload information of the central processing unit at previous timing points where the operating frequency of the central processing unit was maintained or decreased.

According to exemplary embodiments, the increased operating frequency may be calculated based on [Equation 1] below, $$Pf = C \times Max(Load)$$ [Equation 1]

(Here, Pf denotes the increased operating frequency, C denotes a balance constant between performance and power consumption of the central processing unit, and Max(Load) denotes the previous maximum peak workload of the central processing unit.).

According to exemplary embodiments, the increased operating frequency may be adjusted based on [Equation 2] below, $$CPf = K \times Pf$$ [Equation 2]

(Here, CPf denotes an adjusted operating frequency, Pf denotes the increased operating frequency, and K denotes a tendency adjustment constant.).

According to exemplary embodiments, at least one of the clock signal generating unit, the monitoring unit, and the history buffer unit may be included in the clock signal management unit.

Therefore, a method of changing an operating frequency according to exemplary embodiments may reduce unnecessary level of power consumption of a central processing unit while ensuring performance of the central processing unit by changing an operating frequency of the central processing unit based on a previous maximum peak workload of the central processing unit that exists in a history period of a dynamic voltage and frequency scaling that is performed on the central processing unit when the operating frequency of the central processing unit is increased by the dynamic voltage and frequency scaling.

A system on-chip according to exemplary embodiments may reduce unnecessary level of power consumption of a central processing unit while ensuring performance of the central processing unit by changing an operating frequency of the central processing unit based on a previous maximum peak workload of the central processing unit that is stored in a history buffer unit when the operating frequency of the central processing unit is increased by a dynamic voltage and frequency scaling that is performed on the central processing unit.

A mobile device having the system on-chip according to exemplary embodiments may operate using low power, and may provide high performance.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

Figure 1:
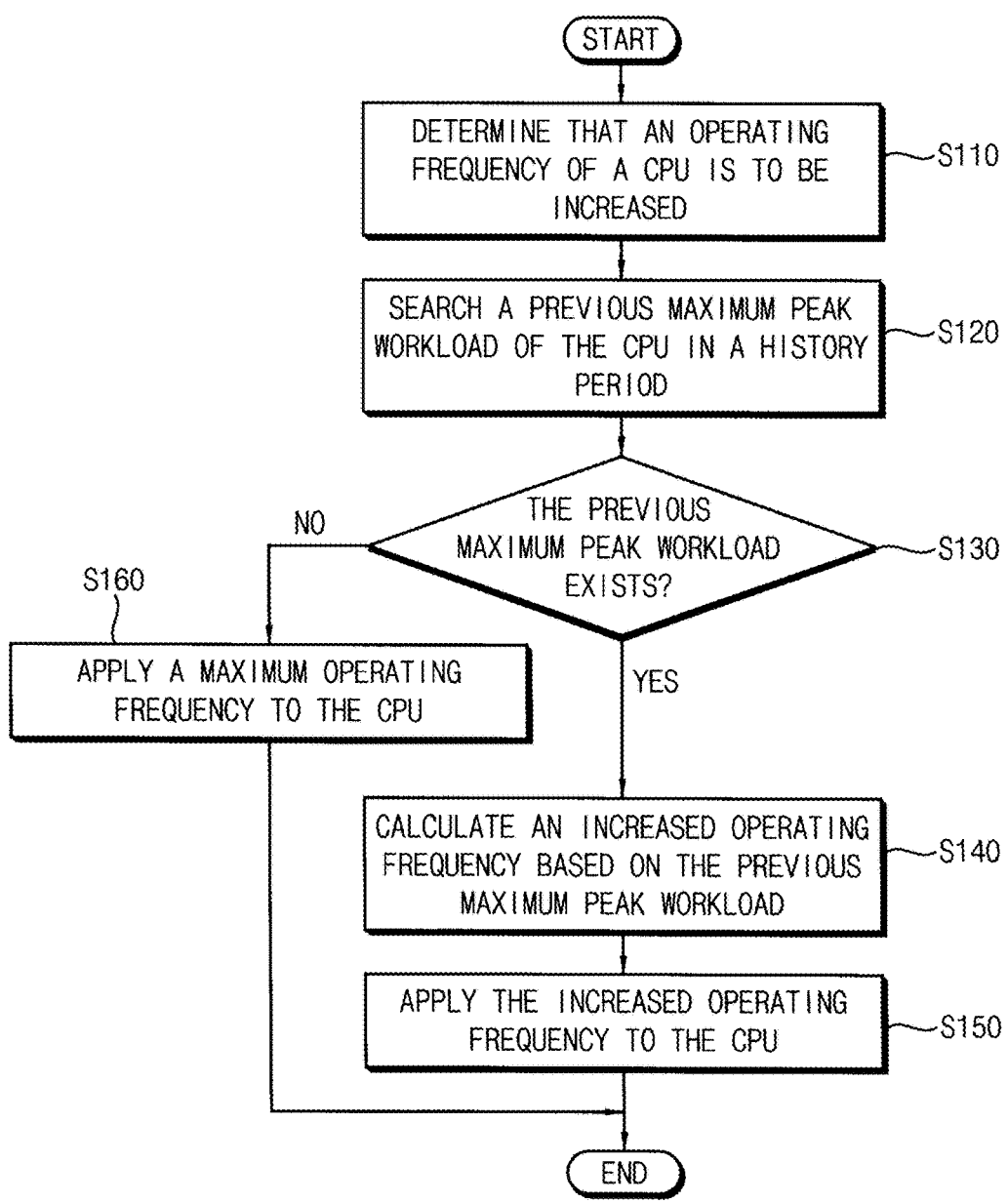
FIG. 1 is a flow chart illustrating a method of changing an operating frequency according to exemplary embodiments.

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein. Rather, these exemplary embodiments are provided so that this disclosure will be thorough and complete, and will fully convey the scope of the present inventive concept to those skilled in the art. In the drawings, the sizes and relative sizes of layers and regions may be exaggerated for clarity. Like numerals may refer to like elements throughout.

It will be understood that when an element is referred to as being "connected" or "coupled" to another element, it can be directly connected or coupled to the other element or intervening elements may be present.

Figure 2:
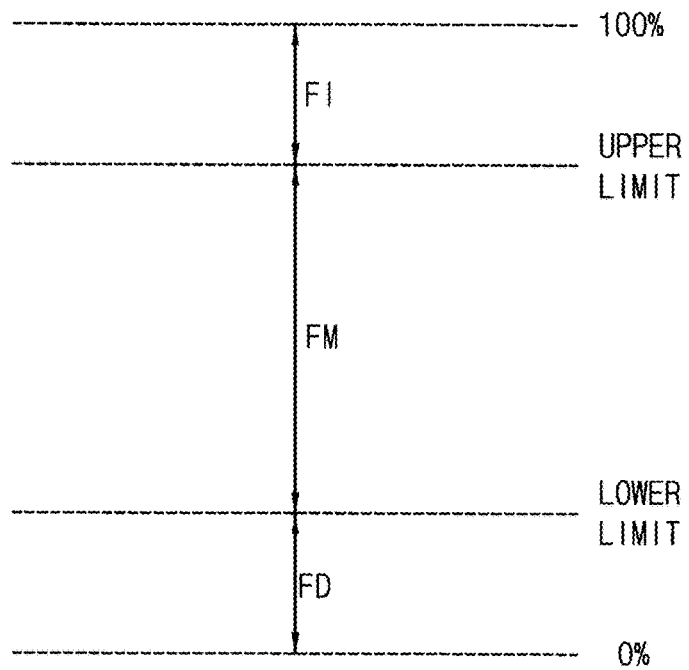
FIG. 2 is a diagram illustrating an example in which a dynamic voltage and frequency scaling is performed in relation to the method shown in FIG. 1.
Figure 3A:
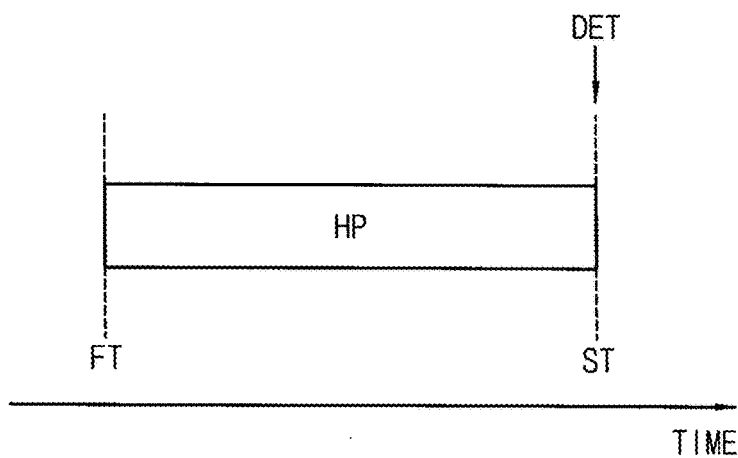
FIGS. 3A and 3B are diagrams illustrating a history period in which a previous maximum peak workload of a central processing unit is detected by the method shown in FIG. 1.
Figure 3B:
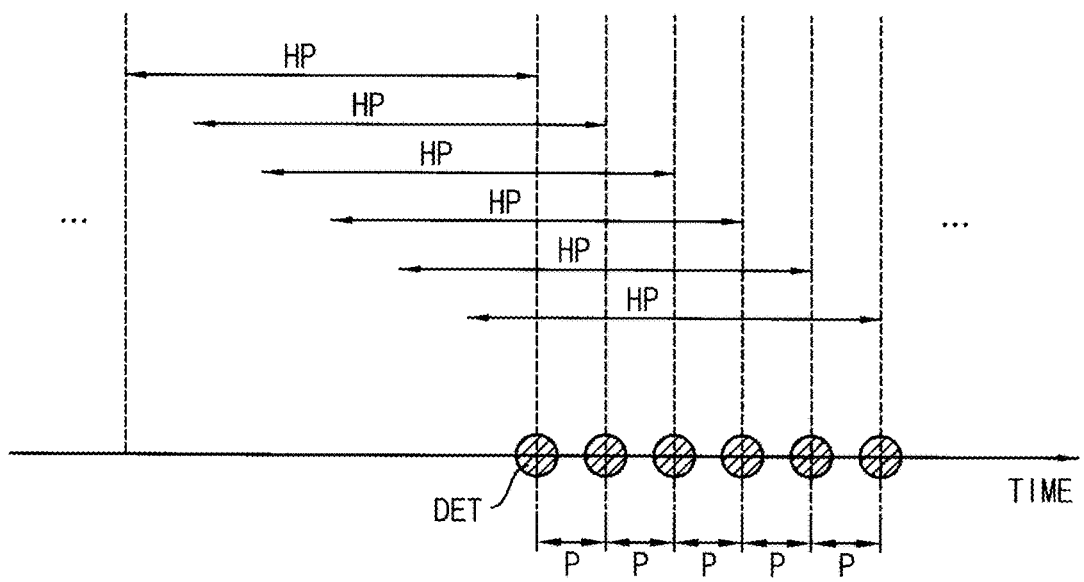

FIG. 1 is a flow chart illustrating a method of changing an operating frequency according to exemplary embodiments. FIG. 2 is a diagram illustrating an example in which a dynamic voltage and frequency scaling is performed in relation to the method shown in FIG. 1. FIGS. 3A and 3B are diagrams illustrating a history period in which a previous maximum peak workload of a central processing unit is detected by the method shown in FIG. 1.

Referring to FIGS. 1 through 3B, it is illustrated that a dynamic voltage and frequency scaling (DVFS) is performed on a central processing unit (CPU) included in a system on-chip (SOC). In an exemplary embodiment, the system on-chip may correspond to an application processor included in a mobile device. The method shown in FIG. 1 may determine that an operating frequency of the central processing unit is to be increased (S110), and then may search a previous maximum peak workload of the central processing unit in a history period HP of the dynamic voltage and frequency scaling that is performed on the central processing unit (S120). Subsequently, the method shown in FIG. 1 may check whether the previous maximum peak workload of the central processing unit exists in the history period HP of the dynamic voltage and frequency scaling (S130). Here, when the previous maximum peak workload of the central processing unit exists in the history period HP of the dynamic voltage and frequency scaling (Yes, Step S130), the method shown in FIG. 1 may calculate an increased operating frequency based on the previous maximum peak workload of the central processing unit (S140), and then may apply the increased operating frequency to the central processing unit (S150). When the previous maximum peak workload of the central processing unit does not exist in the history period HP of the dynamic voltage and frequency scaling (No, Step S130), the method shown in FIG. 1 may apply a maximum operating frequency of the central processing unit to the central processing unit (S160). For example, the method shown in FIG. 1 may apply the maximum operating frequency of the central processing unit to the central processing unit when the previous maximum peak workload of the central processing unit is not detected in the history period HP of the dynamic voltage and frequency scaling.

The dynamic voltage and frequency scaling may be performed on the central processing unit in the system on-chip (e.g., an application processor, etc.) by dynamically changing an operating voltage and an operating frequency of the central processing unit based on a workload ratio of the central processing unit. For example, the dynamic voltage and frequency scaling may be performed on the central processing unit in the system on-chip by anticipating a future operating state of the central processing unit based on a current operating state of the central processing unit, and by changing the operating voltage and the operating frequency of the central processing unit based on the anticipated operating state of the central processing unit. For example, as illustrated in FIG. 2, the operating frequency of the central processing unit may be increased when the workload ratio of the central processing unit is within a range FI that is higher than a predetermined upper limit UPPER LIMIT, the operating frequency of the central processing unit may be decreased when the workload ratio of the central processing unit is within a range FD that is lower than a predetermined lower limit LOWER LIMIT, and the operating frequency of the central processing unit may be maintained when the workload ratio of the central processing unit is within a range FM that is between the predetermined upper limit UPPER LIMIT and the predetermined lower limit LOWER LIMIT. Generally, a workload of the central processing unit may be calculated by multiplying the workload ratio of the central processing unit by the operating frequency of the central processing unit. Here, in a situation where the operating frequency of the central processing unit is decreased, the workload of the central processing unit may be easily and accurately detected. However, in a situation where the operating frequency of the central processing unit is increased, it may be difficult to accurately detect the workload of the central processing unit. For example, in a situation where the operating frequency of the central processing unit is 200 MHz, the workload of the central processing unit might not be accurately detected if the workload ratio of the central processing unit is 100%.

For this reason, when a dynamic voltage and frequency scaling technique is practically applied to the system on-chip, in a situation where the operating frequency of the central processing unit is increased, the operating frequency of the central processing unit may be set to be the maximum operating frequency of the central processing unit to sufficiently secure performance of the central processing unit. As a result, the central processing unit included in the system on-chip may consume an unnecessary amount of power in a situation where the operating frequency of the central processing unit is increased.

To solve these problems, exemplary embodiments may efficiently change the operating frequency of the central processing unit by allowing for previous peak workloads of the central processing unit when the operating frequency of the central processing unit is increased by the dynamic voltage and frequency scaling that is performed on the central processing unit. For example, the method shown in FIG. 1 may determine that the operating frequency of the central processing unit is to be increased (S110), and then may search the previous maximum peak workload of the central processing unit in the history period HP of the dynamic voltage and frequency scaling (S120). For example, the method shown in FIG. 1 may determine that the operating frequency of the central processing unit is to be increased when the workload ratio of the central processing unit is within the range FI that is higher than the predetermined upper limit UPPER LIMIT. The dynamic voltage and frequency scaling may be performed on a predetermined cycle (e.g., 100 microseconds (μs)). For example, an operation of calculating the workload ratio of the central processing unit during a predetermined time P (e.g., 100 μs) and an operation of increasing, decreasing, or maintaining the operating frequency of the central processing unit based on the calculated workload ratio may be repeatedly performed. As illustrated in FIG. 3A, the history period HP (e.g., 3 seconds(s)) of the dynamic voltage and frequency scaling may be between a first timing point FT and a second timing point ST, where the second timing point ST is a timing point where the operating frequency of the central processing unit is determined to be increased (e.g., indicated as DET), and the first timing point FT is a timing point that is prior to the second timing point ST by a predetermined time. Here, the history period HP of the dynamic voltage and frequency scaling may be determined according to required conditions. For example, in a situation where a workload of the central processing unit forms a stable workload pattern for a relatively long time, the history period HP of the dynamic voltage and frequency scaling may be set to be relatively long. In a situation where the workload of the central processing unit forms an unstable workload pattern for a relatively short time, the history period HP of the dynamic voltage and frequency scaling may be set to be relatively short.

Subsequently, the method shown FIG. 1 may check whether the previous maximum peak workload of the central processing unit exists in the history period HP of the dynamic voltage and frequency scaling (S130). Here, the previous maximum peak workload of the central processing unit may refer to the greatest peak workload among previous peak workloads of the central processing unit that exist in the history period HP of the dynamic voltage and frequency scaling. In some exemplary embodiments, the previous peak workloads of the central processing unit may be considered only when the operating frequency of the central processing unit is increased in the history period HP of the dynamic voltage and frequency scaling. Therefore, when previous peak workloads of the central processing unit at previous timing points where the operating frequency of the central processing unit was increased are detected in the history period HP of the dynamic voltage and frequency scaling, a maximum value of the previous peak workloads of the central processing unit may be determined to be the previous maximum peak workload of the central processing unit. As may be seen by FIG. 3B, the operating frequency of the central processing unit may be continuously increased by the dynamic voltage and frequency scaling that is performed on the central processing unit. As may be seen by FIG. 3B, when the operating frequency of the central processing unit is determined to be increased (e.g., indicated as DET) at a specific timing point, the method shown in FIG. 1 may check whether the previous maximum peak workload of the central processing unit exists in a period between a prior timing point and the specific timing point (e.g., referred to as the history period HP of the dynamic voltage and frequency scaling), where the prior timing point is a timing point that is prior to the specific timing point by a predetermined time. Here, since the history period HP of the dynamic voltage and frequency scaling is fixed, as time goes on, new data (e.g., new previous peak workloads of the central processing unit) may be included as candidates, and old data (e.g., old previous peak workloads of the central processing unit) may be excluded from the candidates. For example, the method shown in FIG. 1 may consider the previous peak workloads of the central processing unit as the candidates in a first-in first-out (FIFO) manner. As illustrated in FIG. 3B, the dynamic voltage and frequency scaling may be performed on the central processing unit many times in the history period HP of the dynamic voltage and frequency scaling. For example, when the dynamic voltage and frequency scaling is performed on the central processing unit at an interval of the predetermined time P (e.g., 100 μs), the history period HP of the dynamic voltage and frequency scaling may be set to have three seconds.

When the previous maximum peak workload of the central processing unit exists in the history period HP of the dynamic voltage and frequency scaling, the method shown in FIG. 1 may calculate the increased operating frequency based on the previous maximum peak workload of the central processing unit (S140), and then may apply the increased operating frequency to the central processing unit (S150). Generally, a workload of the central processing unit is not rapidly changed when an electronic device executes the same application program. Thus, the method shown in FIG. 1 may expect, by allowing for operation-continuity of the central processing unit, that an anticipated workload of the central processing unit is to be smaller than the previous maximum peak workload of the central processing unit that exists in a predetermined previous period (e.g., the history period HP of the dynamic voltage and frequency scaling) even when the operating frequency of the central processing unit is determined to be increased. In exemplary embodiments, the increased operating frequency may be calculated based on [Equation 1] below.

$$Pf = C \times \mathrm{Max}(\mathrm{Load}) \qquad \text{[Equation 1]}$$

(Here, Pf denotes the increased operating frequency, C denotes a balance constant between performance and power consumption of the central processing unit, and Max(Load) denotes the previous maximum peak workload of the central processing unit.)

As shown in [Equation 1], the increased operating frequency to be applied to the central processing unit may become equal to the previous maximum peak workload of the central processing unit if the balance constant C is 1. In addition, the increased operating frequency to be applied to the central processing unit may become smaller than the previous maximum peak workload of the central processing unit if the balance constant C is smaller than 1. Further, the increased operating frequency to be applied to the central processing unit may become greater than the previous maximum peak workload of the central processing unit if the balance constant C is greater than 1. Thus, in a situation where an improvement of the performance of the central processing unit is more important than a reduction of the power consumption of the central processing unit (e.g., where CPU performance improvement is required), the method shown in FIG. 1 may control the increased operating frequency to be greater than the previous maximum peak workload of the central processing unit by increasing the balance constant C. For example, in a situation where a reduction of the power consumption of the central processing unit is more important than an improvement of the performance of the central processing unit (e.g., where reduced power consumption is required), the method shown in FIG. 1 may control the increased operating frequency to be smaller than the previous maximum peak workload of the central processing unit by decreasing the balance constant C.

In addition, when the operating frequency of the central processing unit tends to be continuously increased as the dynamic voltage and frequency scaling is performed on the central processing unit, the method shown in FIG. 1 may adjust the increased operating frequency. In an exemplary embodiment, the increased operating frequency may be adjusted based on [Equation 2] below.

$$CPf = K \times Pf \qquad \text{[Equation 2]}$$

(Here, CPf denotes an adjusted operating frequency, Pf denotes the increased operating frequency, and K denotes a tendency adjustment constant.)

As shown in [Equation 2], the increased operating frequency to be applied to the central processing unit might not be adjusted if the tendency adjustment constant K is 1. For example, the increased operating frequency to be applied to the central processing unit may become equal to the previous maximum peak workload of the central processing unit. Here, the tendency adjustment constant K is set to be greater than 1. However, the present inventive concept does not exclude a case in which the tendency adjustment constant K is set to be smaller than 1. Thus, if the tendency adjustment constant K is greater than 1, the increased operating frequency to be applied to the central processing unit may be adjusted to have a greater value. Generally, when the operating frequency of the central processing unit was increased by a previous dynamic voltage and frequency scaling, the operating frequency of the central processing unit is likely to be increased at this point in time (e.g., there is a high possibility that the operating frequency of the central processing unit is increased at this point in time). Thus, the method shown in FIG. 1 may adjust the increased operating frequency to have a greater value by applying the tendency adjustment constant K.

When the previous maximum peak workload of the central processing unit does not exist in the history period HP of the dynamic voltage and frequency scaling, the method shown in FIG. 1 may apply the maximum operating frequency of the central processing unit to the central processing unit (S160). For example, when the operating frequency of the central processing unit is only maintained or decreased by the dynamic voltage and frequency scaling in the history period HP of the dynamic voltage and frequency scaling, the previous maximum peak workload of the central processing unit might not exist. It may be difficult to detect (or, determine) a workload pattern of the central processing unit based on intermittent events or first-occurrence events. Therefore the method shown in FIG. 1 may apply the maximum operating frequency of the central processing unit to the central processing unit. As a result, the method shown in FIG. 1 may prevent users from perceiving performance degradation that is caused when the operating frequency of the central processing unit for the intermittent events or the first-occurrence events is relatively low. In some exemplary embodiments, an executing application program may be changed in the electronic device. When the operating frequency of the central processing unit is increased for the first time after the change of the executing application program, the method shown in FIG. 1 may apply the maximum operating frequency of the central processing unit to the central processing unit, regardless of whether the previous maximum peak workload of the central processing unit exists in the history period HP of the dynamic voltage and frequency scaling. As described above, the method shown in FIG. 1 may reduce unnecessary level of power consumption of the central processing unit while ensuring performance of the central processing unit by changing the operating frequency of the central processing unit based on the previous maximum peak workload of the central processing unit that exists in the history period HP of the dynamic voltage and frequency scaling that is performed on the central processing unit when the operating frequency of the central processing unit is increased by the dynamic voltage and frequency scaling.

Figure 4A:
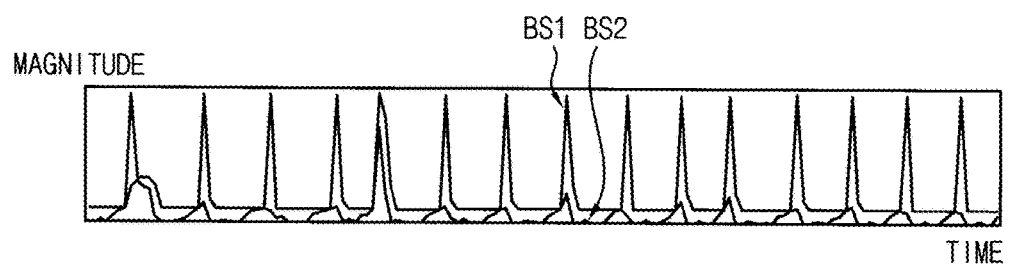
FIGS. 4A and 4B are diagrams illustrating a reduction effect of unnecessary level of power consumption that is achieved by the method shown in FIG. 1 when a social networking service is executed in a mobile device.
Figure 4B:
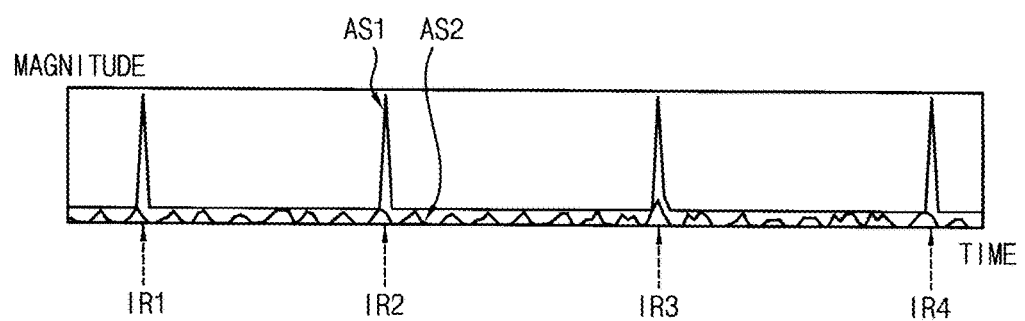
Figure 5A:
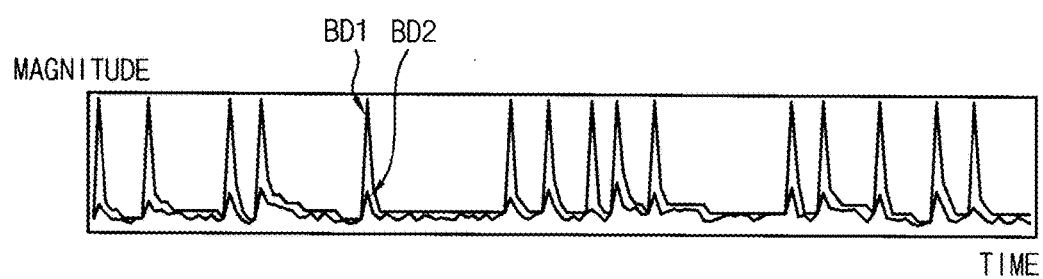
FIGS. 5A and 5B are diagrams illustrating a reduction effect of unnecessary level of power consumption that is achieved by the method shown in FIG. 1 when a three-dimensional (3D) game is executed in a mobile device.
Figure 5B:
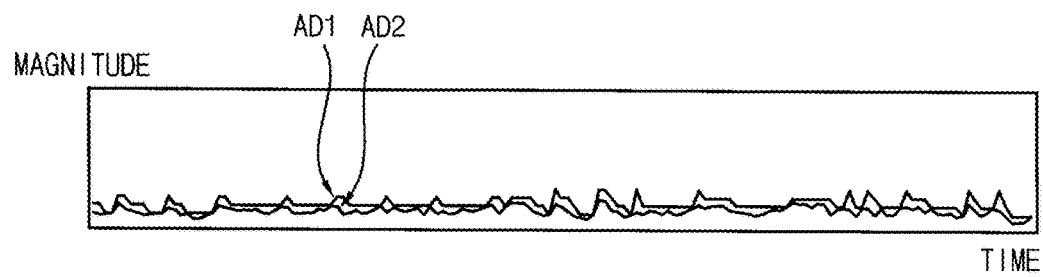

FIGS. 4A and 4B are diagrams illustrating a reduction effect of unnecessary level of power consumption that is achieved by the method shown in FIG. 1 when a social networking service is executed in a mobile device. FIGS. 5A and 5B are diagrams illustrating a reduction effect of unnecessary level of power consumption that is achieved by the method shown in FIG. 1 when a three-dimensional (3D) game is executed in a mobile device.

Referring to FIGS. 4A through 5B, it is illustrated that the reduction effect of the unnecessary level of power consumption is achieved by the method shown in FIG. 1. For example, FIGS. 4A and 4B show that a social networking service is executed in the mobile device. In addition, FIGS. 5A and 5B show that a 3D game is executed in the mobile device. As described above, a trade-off relationship exists between performance (e.g., operating frequency and operating voltage) and power consumption of the central processing unit, and the operating voltage of the central processing unit follows the operating frequency of the central processing unit. For example, an operation of changing the operating frequency of the central processing unit may be performed inside a system on-chip (e.g., an application processor), and an operation of changing the operating voltage of the central processing unit may be performed outside the system on-chip. Here, the operating voltage of the central processing unit may increase as the operating frequency of the central processing unit increases, and the operating voltage of the central processing unit may decrease as the operating frequency of the central processing unit decreases. Accordingly, since a reduction of an unnecessary operating frequency of the central processing unit results in a reduction of an unnecessary operating voltage of the central processing unit, the method shown in FIG. 1 may prevent the central processing unit from consuming an unnecessary level of power by reducing the unnecessary operating frequency of the central processing unit.

FIG. 4A shows execution of the social networking service in a mobile device. In FIG. 4A, a first waveform BS1 indicates an operating frequency of the central processing unit, and a second waveform BS2 indicates a workload of the central processing unit. Generally, when a social networking service such as sending messages is executed by the central processing unit, the central processing unit might not experience a relatively high peak workload. For example, the central processing unit may experience a relatively low peak workload with time. Nevertheless, as illustrated in FIG. 4A, the mobile device that employs a dynamic voltage and frequency scaling technique provides a maximum operating frequency to the central processing unit whenever a message transmission is performed by the central processing unit. This is for increasing responsiveness to a fluctuation of the workload of the central processing unit, but results in unnecessary level of power consumption. Sometimes, when the message transmission is performed by the central processing unit, a workload ratio of the central processing unit is just about 20% at the maximum operating frequency supplied to the central processing unit, thereby unnecessary level of power consumption may occur in the mobile device. FIG. 4B shows that the social networking service is executed in a mobile device that employs the method shown FIG. 1. In FIG. 4B, a first waveform AS1 indicates an operating frequency of the central processing unit, and a second waveform AS2 indicates a workload of the central processing unit. As illustrated in FIG. 4B, the method shown in FIG. 1 may change the operating frequency of the central processing unit based on the previous maximum peak workload of the central processing unit that exists in the history period of the dynamic voltage and frequency scaling whenever the message transmission is performed by the central processing unit. As a result, the method shown in FIG. 1 may efficiently control the operating frequency of the central processing unit while increasing the responsiveness to the fluctuation of the workload of the central processing unit. Meanwhile, a plurality of timings IR1, IR2, IR3, and IR4 at which the maximum operating frequency of the central processing unit is applied to the central processing unit by the method shown in FIG. 1 are shown in FIG. 4B. As described above, the method shown in FIG. 1 may apply the maximum operating frequency of the central processing unit to the central processing unit at the timings IR1, IR2, IR3, and IR4 because it is difficult to detect (or, determine) a workload pattern of the central processing unit based on intermittent events or first-occurrence events.

FIG. 5A shows the 3D game executed in a mobile device. In FIG. 5A, a first waveform BD1 indicates an operating frequency of the central processing unit, and a second waveform BD2 indicates a workload of the central processing unit. Generally, when the 3D game is executed by the central processing unit, the central processing unit may experience a relatively high peak workload with time because the 3D game results in many computations of the central processing unit. Nevertheless, as illustrated in FIG. 5A, the mobile device that employs the dynamic voltage and frequency scaling technique provides the maximum operating frequency to the central processing unit whenever the computations are increased in the central processing unit. This is for increasing the responsiveness to the fluctuation of the workload of the central processing unit, but results in unnecessary level of power consumption. Sometimes, when the computations are increased in the central processing unit, the workload ratio of the central processing unit is just about 40% at the maximum operating frequency supplied to the central processing unit, thereby unnecessary level of power consumption may occur in the mobile device. For example, FIG. 5B shows that the 3D game is executed in a mobile device that employs the method shown FIG. 1. In FIG. 5B, a first waveform AD1 indicates an operating frequency of the central processing unit, and a second waveform AD2 indicates a workload of the central processing unit. As illustrated in FIG. 5B, the method shown in FIG. 1 may change the operating frequency of the central processing unit based on the previous maximum peak workload of the central processing unit that exists in the history period of the dynamic voltage and frequency scaling whenever the computations are increased in the central processing unit. As a result, the method shown in FIG. 1 may efficiently control the operating frequency of the central processing unit while increasing the responsiveness to the fluctuation of the workload of the central processing unit. Meanwhile, it is illustrated in FIG. 5B that the central processing unit continuously computes to execute the 3D game (e.g., no intermittent events or no first-occurrence events occur). However, if the intermittent events or the first-occurrence events occur while the 3D game is executed in the mobile device, the method shown in FIG. 1 may apply the maximum operating frequency of the central processing unit to the central processing unit.

Figure 6:
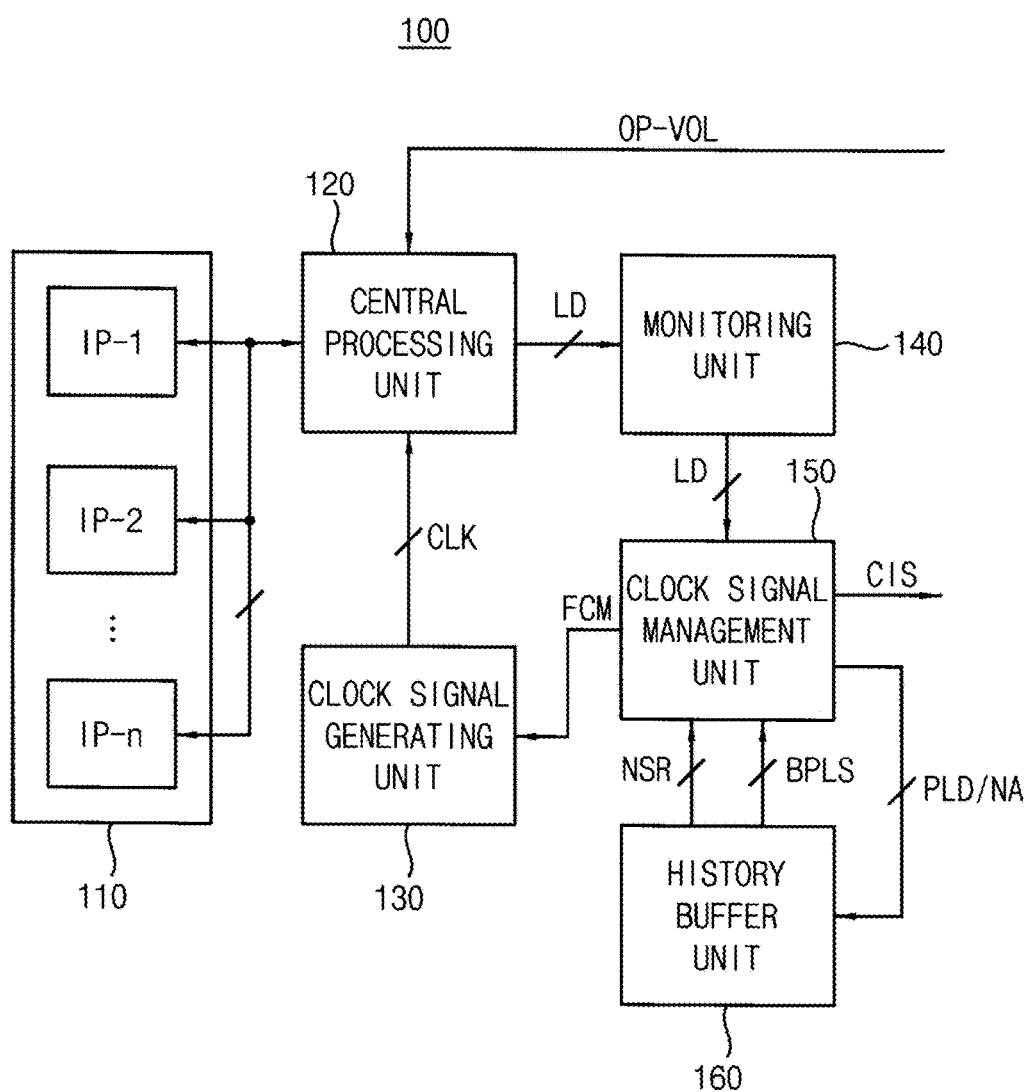
FIG. 6 is a block diagram illustrating a system on-chip according to exemplary embodiments.
Figure 7:
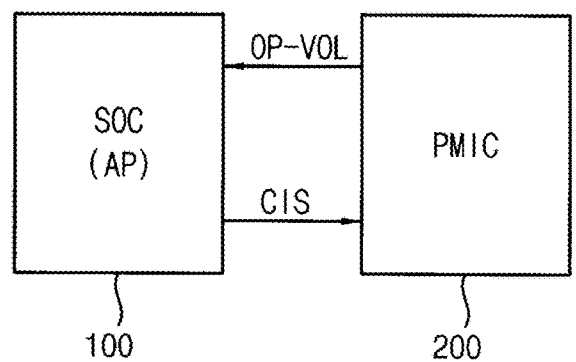
FIG. 7 is a diagram illustrating an example in which a dynamic voltage and frequency scaling is performed in relation to the system on-chip of FIG. 6.
Figure 8:
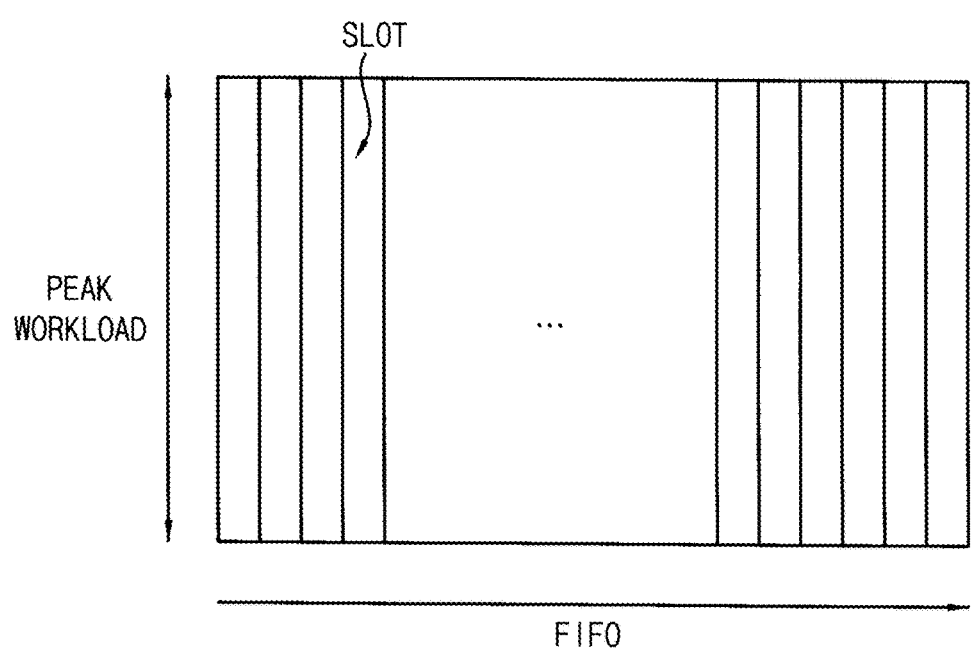
FIG. 8 is a diagram illustrating an example in which a history buffer unit included in the system on-chip of FIG. 6 is implemented as a queue having a predetermined capacity.

FIG. 6 is a block diagram illustrating a system on-chip according to exemplary embodiments. FIG. 7 is a diagram illustrating an example in which a dynamic voltage and frequency scaling is performed in relation to the system on-chip of FIG. 6. FIG. 8 is a diagram illustrating an example in which a history buffer unit included in the system on-chip of FIG. 6 is implemented as a queue having a predetermined capacity.

Referring to FIGS. 6 through 8, the system on-chip 100 may include at least one intellectual property unit (IP) 110, a central processing unit 120, a clock signal generating unit 130, a monitoring unit 140, a clock signal management unit 150, and a history buffer unit 160. Although it is illustrated in FIG. 6 that the clock signal generating unit 130, the monitoring unit 140, and the history buffer unit 160 are implemented separately from the clock signal management unit 150, a structure of the system on-chip 100 is not limited thereto. In some exemplary embodiments, at least one of the clock signal generating unit 130, the monitoring unit 140, and the history buffer unit 160 may be implemented inside the clock signal management unit 150. In some exemplary embodiments, the system on-chip 100 may correspond to an application processor (AP).

Generally, an operation of changing an operating frequency FCM of the central processing unit 120 may be performed inside the system on-chip 100, and an operation of changing an operating voltage OP-VOL of the central processing unit 120 may be performed outside the system on-chip 100 (e.g., by a power management integrated circuit 200). For example, because the power management integrated circuit 200 is generally placed outside the system on-chip 100 owing to various factors such as a noise, etc. In some exemplary embodiments, the power management integrated circuit 200 may be incorporated within the system on-chip 100. Both an operation of changing the operating frequency FCM of the central processing unit 120 and an operation of changing the operating voltage OP-VOL of the central processing unit 120 may be performed inside the system on-chip 100. According to exemplary embodiments, as illustrated in FIG. 7, the system on-chip 100 may communicate with the power management integrated circuit 200 to perform a dynamic voltage and frequency scaling in real-time. As described above, since the operating voltage OP-VOL follows the operating frequency FCM (e.g., the operating voltage OP-VOL increases as the operating frequency FCM increases, and the operating voltage OP-VOL decreases as the operating frequency FCM decreases) in the central processing unit 120, the power management integrated circuit 200 may receive anticipated change information CIS of the operating frequency FCM of the central processing unit 120 from the system on-chip 100, and may control and provide the operating voltage OP-VOL of the central processing unit 120 based on the anticipated change information CIS. For example, when the power management integrated circuit 200 receives the anticipated change information CIS indicating that the operating frequency FCM of the central processing unit 120 is to be increased, the power management integrated circuit 200 may increase the operating voltage OP-VOL to be applied to the central processing unit 120 before the operating frequency FCM of the central processing unit 120 is increased. When the power management integrated circuit 200 receives the anticipated change information CIS indicating that the operating frequency FCM of the central processing unit 120 is to be decreased, the power management integrated circuit 200 may decrease the operating voltage OP-VOL to be applied to the central processing unit 120 after the operating frequency FCM of the central processing unit 120 is decreased.

The at least one intellectual property unit 110 may perform a specific operation in the system on-chip 100. For example, the at least one intellectual property unit 110 may correspond to various components of the system on-chip 100 (e.g., a video controller, a display controller, a memory device, etc). The central processing unit 120 may communicate with the at least one intellectual property unit 110, and may perform various operations for the at least one intellectual property unit 110. Here, the central processing unit 120 may operate based on a clock signal CLK, where a frequency of the clock signal CLK corresponds to the operating frequency FCM of the central processing unit 120. The clock signal generating unit 130 may generate the clock signal CLK based on the operating frequency FCM of the central processing unit that is determined by the clock signal management unit 120, and may provide the clock signal CLK to the central processing unit 120. The monitoring unit 140 may monitor a workload LD of the central processing unit 120, and may provide the workload LD of the central processing unit 120 to the clock signal management unit 150. The clock signal management unit 150 may receive the workload LD of the central processing unit 120 from the monitoring unit 140, and may calculate a workload ratio of the central processing unit 120. Here, the clock signal management unit 150 may increase the operating frequency FCM of the central processing unit 120 corresponding to the frequency of the clock signal CLK when the workload ratio of the central processing unit 120 is higher than a predetermined upper limit, may decrease the operating frequency FCM of the central processing unit 120 when the workload ratio of the central processing unit 120 is lower than a predetermined lower limit, and maintain the operating frequency FCM of the central processing unit 120 when the workload ratio of the central processing unit 120 is between the predetermined upper limit and the predetermined lower limit. In some exemplary embodiments, the monitoring unit 140 may calculate the workload ratio of the central processing unit 120 to provide the workload ratio of the central processing unit 120 to the clock signal management unit 150.

As described above, in the system on-chip 100, the dynamic voltage and frequency scaling may be performed on the central processing unit 120 by dynamically changing the operating frequency FCM and the operating voltage OP-VOL of the central processing unit 120 based on the workload ratio of the central processing unit 120. For example, the dynamic voltage and frequency scaling may be performed on the central processing unit 120 by anticipating a future operating state of the central processing unit 120 based on a current operating state of the central processing unit 120, and by changing the operating voltage OP-VOL and the operating frequency FCM of the central processing unit 120 based on the anticipated operating state of the central processing unit 120. The workload LD of the central processing unit 120 may be calculated by multiplying the workload ratio of the central processing unit 120 by the operating frequency FCM of the central processing unit 120. Here, in a situation where the operating frequency FCM of the central processing unit 120 is decreased, it is easy to accurately detect the workload LD of the central processing unit 120. However, in a situation where the operating frequency FCM of the central processing unit 120 is increased, it is difficult to accurately detect the workload LD of the central processing unit 120. For example, in a situation where the operating frequency FCM of the central processing unit 120 is 200 MHz, the workload LD of the central processing unit 120 might not be accurately detected if the workload ratio of the central processing unit 120 is 100%. For this reason, in a situation where the operating frequency FCM of the central processing unit 120 is increased, the operating frequency FCM of the central processing unit 120 may be set to be a maximum operating frequency of the central processing unit 120 in order to sufficiently secure performance of the central processing unit 120. As a result, the central processing unit 120 included in a system on-chip may consume an unnecessary level of power in a situation where the operating frequency FCM of the central processing unit 120 is increased.

The system on-chip 100, according to exemplary embodiments, may include the history buffer unit 160. Thus, the system on-chip 100 may efficiently change the operating frequency FCM of the central processing unit 120 by conducting a search in the history buffer unit 160 when the clock signal management unit 150 increases the operating frequency FCM of the central processing unit 120. For example, the history buffer unit 160 may store respective peak workloads of the central processing unit 120 (e.g., previous peak workloads PLD) at respective previous timing points where the operating frequency FCM of the central processing unit 120 was increased. In an exemplary embodiment, as illustrated in FIG. 8, the history buffer unit 160 may be implemented as a queue having a predetermined capacity. In addition, the history buffer unit 160 may operate in a first-in first-out (FIFO) manner. For example, the history buffer unit 160 may be implemented as a circular queue having a predetermined capacity, a linear queue having a predetermined capacity, etc. As described above, since the history buffer unit 160 operates in the FIFO manner, as time goes on, new data (e.g., new previous peak workloads PLD of the central processing unit 120) may be included as candidates, and old data (e.g., old previous peak workloads PLD of the central processing unit 120) may be excluded from the candidates. According to exemplary embodiments, the history buffer unit 160 might not store workload information of the central processing unit 120 at previous timing points where the operating frequency FCM of the central processing unit 120 was maintained or decreased. Instead, the history buffer unit 160 may store data NA indicating 'not-available' instead of the workload information of the central processing unit 120. As a result, as time goes on, the previous peak workloads PLD of the central processing unit 120 at previous timing points where the operating frequency FCM of the central processing unit 120 was increased and/or the data NA replacing the workload information of the central processing unit 120 at previous timing points where the operating frequency FCM of the central processing unit 120 was maintained or decreased may be sequentially stored in slots SLOT of the history buffer unit 160 illustrated in FIG. 8. Here, the capacity of the history buffer unit 160 may be variously set according to required conditions. For example, in a situation where the workload LD of the central processing unit 120 forms a stable workload pattern for a relatively long time, the capacity of the history buffer unit 160 may be set to be relatively large. In a situation where the workload LD of the central processing unit 120 forms an unstable workload pattern for a relatively short time, the capacity of the history buffer unit 160 may be set to be relatively small. As illustrated in FIG. 8, the history buffer unit 160 may store information generated by performing the dynamic voltage and frequency scaling many times. For example, when the dynamic voltage and frequency scaling is performed at an interval of a predetermined time (e.g., 100 μs), the history buffer unit 160 may have the capacity for storing information generated by performing the dynamic voltage and frequency scaling during three seconds.

When the clock signal management unit 150 increases the operating frequency FCM of the central processing unit 120, the clock signal management unit 150 may detect a previous maximum peak workload BPLS of the central processing unit 120 in the history buffer unit 160, and may apply an increased operating frequency to the central processing unit 120, where the increased operating frequency is calculated based on the previous maximum peak workload BPLS of the central processing unit 120. Thus, the increased operating frequency may become the operating frequency FCM of the central processing unit 120. Here, the previous maximum peak workload BPLS of the central processing unit 120 may mean the greatest peak workload among the previous peak workloads PLD of the central processing unit 120 that exist in the history buffer unit 160. For example, when the operating frequency FCM of the central processing unit 120 is determined to be increased, the clock signal management unit 150 may check whether the previous maximum peak workload BPLS of the central processing unit 120 exists in the history buffer unit 160. As a result, when the previous maximum peak workload BPLS of the central processing unit 120 exists in the history buffer unit 160, the clock signal management unit 150 may calculate the increased operating frequency based on the previous maximum peak workload BPLS of the central processing unit 120, and then may apply the increased operating frequency to the central processing unit 120. Here, the clock signal generating unit 130 may generate the clock signal CLK having the increased operating frequency, and may provide the clock signal CLK to the central processing unit 120. In an exemplary embodiment, the increased operating frequency may be calculated based on [Equation 1] below.

$$Pf = C \times \text{Max}(\text{Load}) \qquad \text{[Equation 1]}$$

(Here, Pf denotes the increased operating frequency, C denotes a balance constant between performance and power consumption of the central processing unit, and Max(Load) denotes the previous maximum peak workload of the central processing unit.)

As shown in [Equation 1], the increased operating frequency to be applied to the central processing unit 120 may become equal to the previous maximum peak workload BPLS of the central processing unit 120 if the balance constant C is 1. In addition, the increased operating frequency to be applied to the central processing unit 120 may become smaller than the previous maximum peak workload BPLS of the central processing unit 120 if the balance constant C is smaller than 1. Further, the increased operating frequency to be applied to the central processing unit 120 may become greater than the previous maximum peak workload BPLS of the central processing unit 120 if the balance constant C is greater than 1. Thus, in a situation where an increase of the performance of the central processing unit 120 is more important than a reduction of the power consumption of the central processing unit 120 (for example, increased performance is required), the clock signal management unit 150 may control the increased operating frequency to be greater than the previous maximum peak workload BPLS of the central processing unit 120 by increasing the balance constant C. In a situation where a reduction of the power consumption of the central processing unit is more important than an improvement of the performance of the central processing unit (for example, reduced power consumption is required), the clock signal management unit 150 may control the increased operating frequency to be smaller than the previous maximum peak workload BPLS of the central processing unit 120 by decreasing the balance constant C.

In addition, when the operating frequency FCM of the central processing unit 120 tends to be continuously increased as the dynamic voltage and frequency scaling is performed on the central processing unit 120, the clock signal management unit 150 may adjust the increased operating frequency. In an exemplary embodiment, the increased operating frequency may be adjusted based on [Equation 2] below.

$$CPf = K \times Pf \qquad \text{[Equation 2]}$$

(Here, CPf denotes an adjusted operating frequency, Pf denotes the increased operating frequency, and K denotes a tendency adjustment constant.)

As shown in [Equation 2], the increased operating frequency to be applied to the central processing unit 120 might not be adjusted if the tendency adjustment constant K is 1. For example, the increased operating frequency to be applied to the central processing unit 120 may become equal to the previous maximum peak workload BPLS of the central processing unit 120. Here, since the tendency adjustment constant K is related to a tendency for increasing the operating frequency FCM of the central processing unit 120 as the dynamic voltage and frequency scaling is performed, the tendency adjustment constant K is basically set to be greater than 1. However, the present inventive concept does not exclude a case in which the tendency adjustment constant K is set to be smaller than 1. Thus, if the tendency adjustment constant K is greater than 1, the increased operating frequency to be applied to the central processing unit 120 may be adjusted to have a greater value (e.g., the adjusted operating frequency). For example, when the operating frequency FCM of the central processing unit 120 was increased by a previous dynamic voltage and frequency scaling, the operating frequency FCM of the central processing unit 120 is likely to be increased by a current dynamic voltage and frequency scaling (e.g., there is a high possibility that the operating frequency FCM of the central processing unit 120 is increased by the current dynamic voltage and frequency scaling). Thus, the clock signal management unit 150 may adjust the increased operating frequency to have a greater value by applying the tendency adjustment constant K to the increased operating frequency.

When the previous maximum peak workload BPLS of the central processing unit 120 does not exist in the history buffer unit 160, the clock signal management unit 150 may apply a maximum operating frequency of the central processing unit 120 to the central processing unit 120. Thus, the maximum operating frequency of the central processing unit 120 may become the operating frequency FCM of the central processing unit 120. For example, when the operating frequency FCM of the central processing unit 120 is only maintained or decreased by the dynamic voltage and frequency scaling during a specific time, the previous maximum peak workload BPLS of the central processing unit 120 might not exist in the history buffer unit 160. For example, only the data NA indicating 'not-available' instead of the workload information of the central processing unit 120 may exist in the history buffer unit 160. The history buffer unit 160 may output a result signal NSR indicating that the previous maximum peak workload BPLS of the central processing unit 120 does not exist in the history buffer unit 160 to the clock signal management unit 150. Hence, the clock signal management unit 150 might not detect (or, determine) a workload pattern of the central processing unit 120 based on intermittent events or first-occurrence events. Therefore the clock signal management unit 150 may apply the maximum operating frequency of the central processing unit 120 to the central processing unit. As a result, the clock signal management unit 150 may prevent users from perceiving performance degradation that is caused when the operating frequency FCM of the central processing unit 120 for the intermittent events or the first-occurrence events is relatively low. In some exemplary embodiments, an executing application program may be changed in the electronic device. When the operating frequency FCM of the central processing unit 120 is increased for the first time after the change of the executing application program, the clock signal management unit 150 may apply the maximum operating frequency of the central processing unit 120 to the central processing unit 120, regardless of whether the previous maximum peak workload BPLS of the central processing unit 120 exists in the history buffer unit 160. As described above, the system on-chip 100 may perform the dynamic voltage and frequency scaling on the central processing unit 120 based on interactions between the clock signal management unit 150 and the history buffer unit 160. Here, the system on-chip 100 may reduce unnecessary level of power consumption of the central processing unit 120 while ensuring performance of the central processing unit 120 by changing the operating frequency FCM of the central processing unit 120 based on the previous maximum peak workload BPLS of the central processing unit 120 that exists in the history buffer unit 160 when the operating frequency FCM of the central processing unit 120 is increased by the dynamic voltage and frequency scaling.

Figure 9:
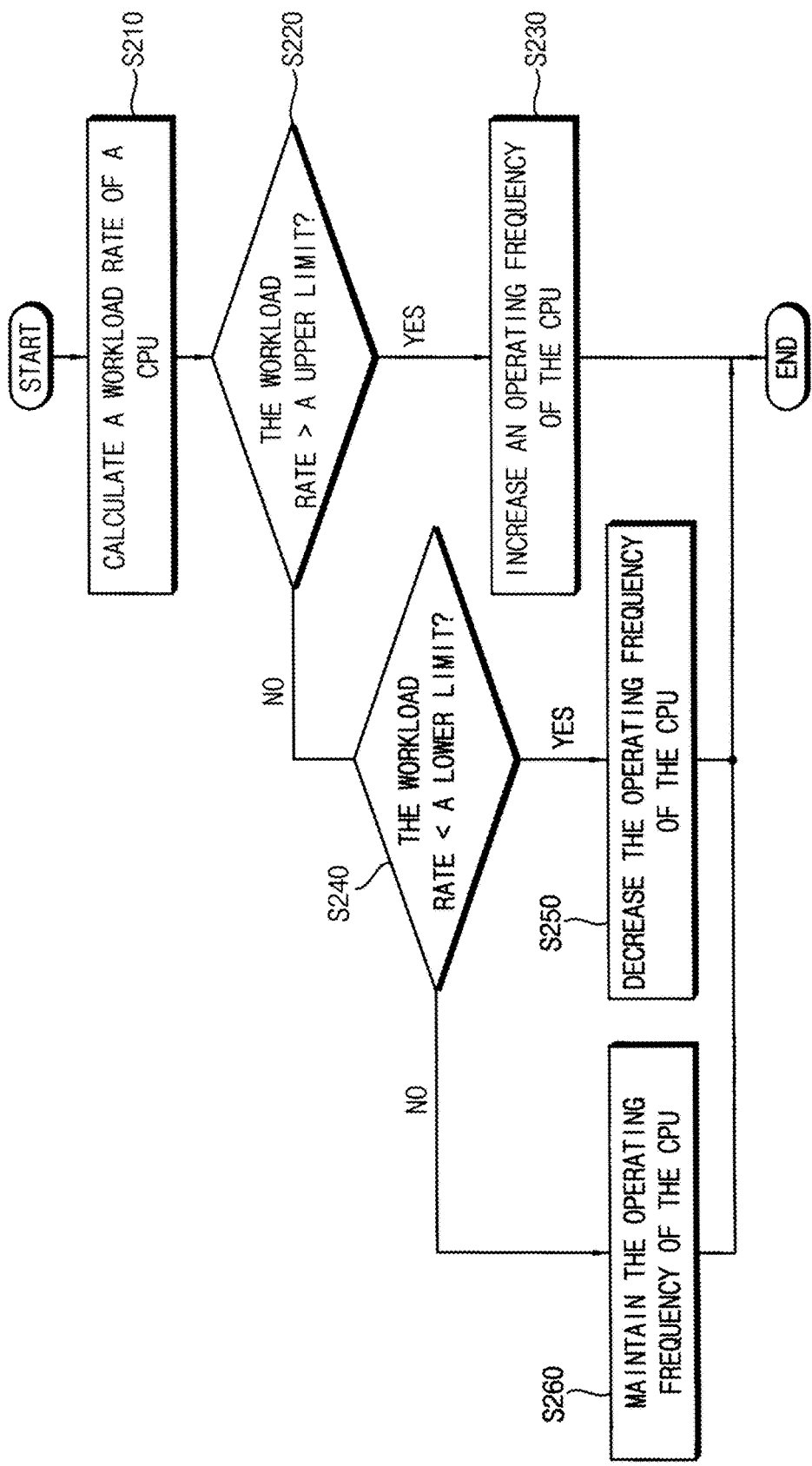
FIG. 9 is a flow chart illustrating an example in which an operating frequency of a central processing unit included in the system on-chip of FIG. 6 is changed.
Figure 10:
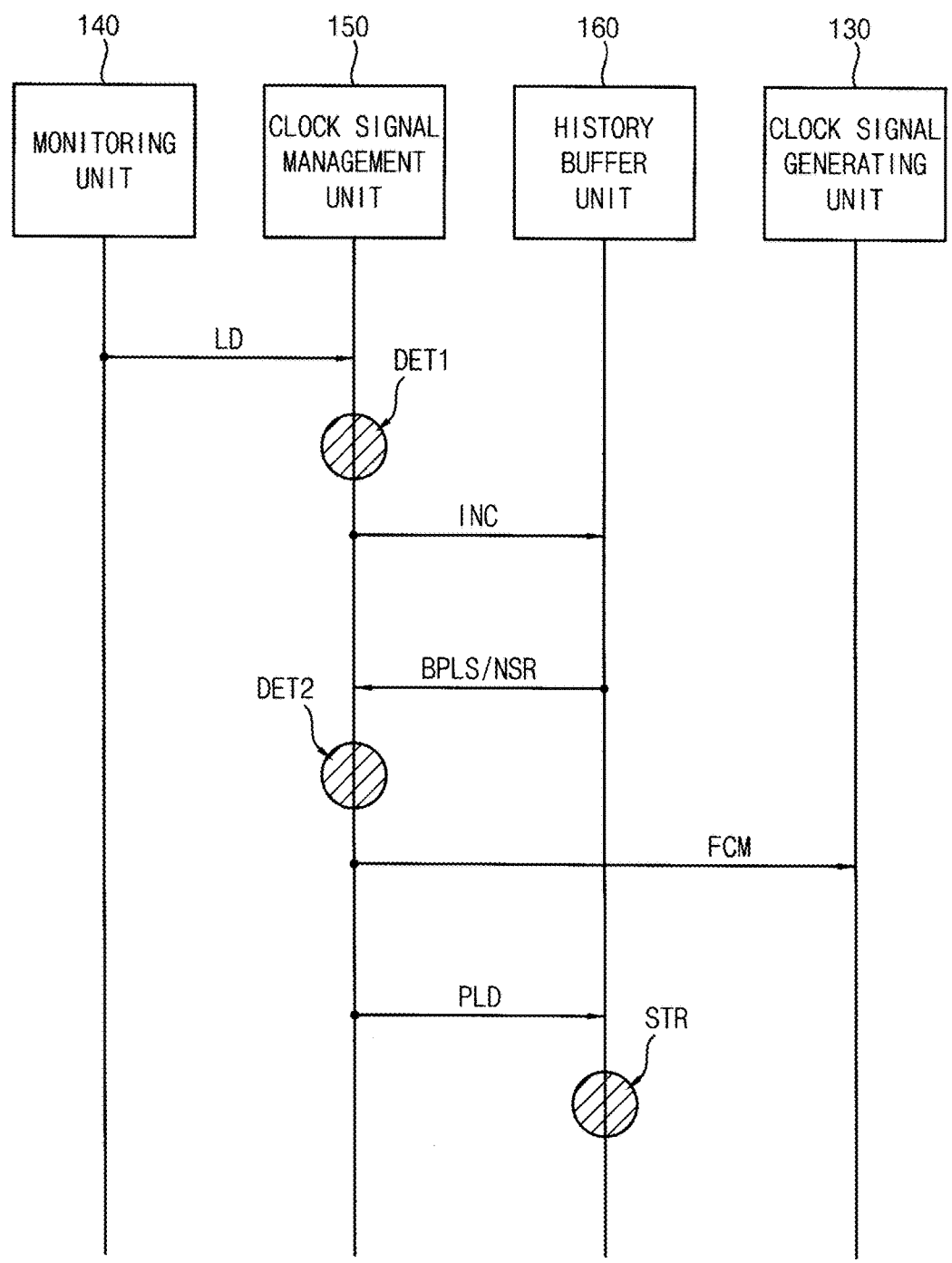
FIG. 10 is a diagram illustrating an example in which an operating frequency of a central processing unit included in the system on-chip of FIG. 6 is increased.
Figure 11:
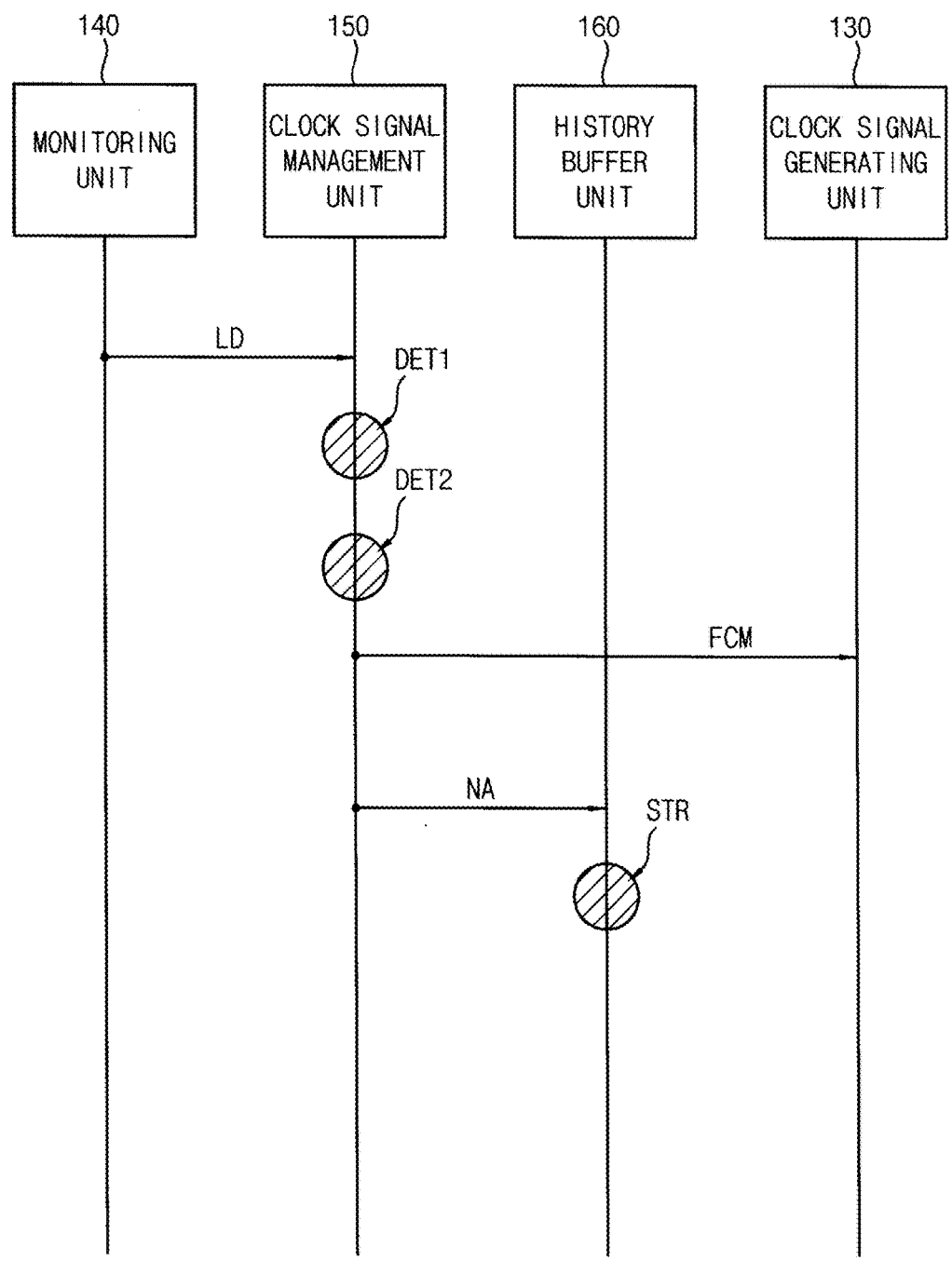
FIG. 11 is a diagram illustrating an example in which an operating frequency of a central processing unit included in the system on-chip of FIG. 6 is maintained or decreased.

FIG. 9 is a flow chart illustrating an example in which an operating frequency of a central processing unit included in the system on-chip of FIG. 6 is changed. FIG. 10 is a diagram illustrating an example in which an operating frequency of a central processing unit included in the system on-chip of FIG. 6 is increased. FIG. 11 is a diagram illustrating an example in which an operating frequency of a central processing unit included in the system on-chip of FIG. 6 is maintained or decreased.

Referring to FIGS. 9 through 11, it is illustrated that the operating frequency FCM of the central processing unit 120 is changed as the dynamic voltage and frequency scaling is performed on the central processing unit 120. For example, the system on-chip 100 may calculate the workload ratio of the central processing unit 120 (S210), and may check whether the workload ratio of the central processing unit 120 is higher than a predetermined upper limit (S220). Here, when the workload ratio of the central processing unit 120 is higher than the predetermined upper limit, the system on-chip 100 may increase the operating frequency FCM of the central processing unit 120 (S230) by allowing for the previous peak workloads PLD of the central processing unit 120. When the workload ratio of the central processing unit 120 is lower than the predetermined upper limit, the system on-chip 100 may check whether the workload ratio of the central processing unit 120 is lower than a predetermined lower limit (S240). Here, when the workload ratio of the central processing unit 120 is lower than the predetermined lower limit, the system on-chip 100 may decrease the operating frequency FCM of the central processing unit 120 (S250) in a predetermined manner. When the workload ratio of the central processing unit 120 is higher than the predetermined lower limit, the system on-chip 100 may maintain the operating frequency FCM of the central processing unit 120 (S260). According to exemplary embodiments, when the system on-chip 100 decreases the operating frequency FCM of the central processing unit 120, the system on-chip 100 may linearly or non-linearly decrease the operating frequency FCM of the central processing unit 120.

FIG. 10 shows that the system on-chip 100 increases the operating frequency FCM of the central processing unit 120. For example, when the monitoring unit 140 provides the workload LD of the central processing unit 120 to the clock signal management unit 150 by monitoring the workload LD of the central processing unit 120, the clock signal management unit 150 may calculate the workload ratio of the central processing unit 120 based on the workload LD of the central processing unit 120, and then may determine that the operating frequency FCM of the central processing unit 120 is to be increased (e.g., indicated as DET1) based on the workload ratio of the central processing unit 120. As described above, the clock signal management unit 150 may determine that the operating frequency FCM of the central processing unit 120 is to be increased if the workload ratio of the central processing unit 120 is higher than the predetermined upper limit. In some exemplary embodiments, the monitoring unit 140 may calculate the workload ratio of the central processing unit 120 based on the workload LD of the central processing unit 120, and then may provide the workload ratio of the central processing unit 120 to the clock signal management unit 150. Subsequently, the clock signal management unit 150 may output a checking signal INC for checking whether the previous maximum peak workload BPLS of the central processing unit 120 exists in the history buffer unit 160. In response to the checking signal INC, the history buffer unit 160 may output the previous maximum peak workload BPLS of the central processing unit 120 to the clock signal management unit 150, or may output a result signal NSR indicating that the previous maximum peak workload BPLS of the central processing unit 120 does not exist in the history buffer unit 160. Therefore, the clock signal management unit 150 may determine the operating frequency FCM to be applied to the central processing unit 120 (e.g., indicated as DET2). For example, when the previous maximum peak workload BPLS of the central processing unit 120 exists in the history buffer unit 160, the clock signal management unit 150 may calculate an increased operating frequency based on the previous maximum peak workload BPLS of the central processing unit 120, and then may determine the operating frequency FCM to be applied to the central processing unit 120 as the increased operating frequency. When the previous maximum peak workload BPLS of the central processing unit 120 does not exist in the history buffer unit 160, the clock signal management unit 150 may determine the operating frequency FCM to be applied to the central processing unit 120 as the maximum operating frequency of the central processing unit 120. Next, since the operating frequency FCM of the central processing unit 120 is increased, the clock signal management unit 150 may output a peak workload PLD of the central processing unit 120 at that timing point to the history buffer unit 160. Hence, the history buffer unit 160 may store the peak workload PLD of the central processing unit 120 (e.g., indicated as STR). As described above, when the dynamic voltage and frequency scaling is performed on the central processing unit 120, the system on-chip 100 may reduce unnecessary level of power consumption of the central processing unit 120 while ensuring performance of the central processing unit 120 by increasing the operating frequency FCM of the central processing unit 120 based on the previous maximum peak workload BPLS of the central processing unit 120 that exists in the history buffer unit 160.

FIG. 11 shows that the system on-chip 100 maintains or decreases the operating frequency FCM of the central processing unit 120. For example, when the monitoring unit 140 provides the workload LD of the central processing unit 120 to the clock signal management unit 150 by monitoring the workload LD of the central processing unit 120, the clock signal management unit 150 may calculate the workload ratio of the central processing unit 120 based on the workload LD of the central processing unit 120, and then may determine that the operating frequency FCM of the central processing unit 120 is to be maintained or decreased (e.g., indicated as DET1) based on the workload ratio of the central processing unit 120. As described above, the clock signal management unit 150 may determine that the operating frequency FCM of the central processing unit 120 is to be maintained if the workload ratio of the central processing unit 120 is between a predetermined lower limit and the predetermined upper limit. In addition, the clock signal management unit 150 may determine that the operating frequency FCM of the central processing unit 120 is to be decreased if the workload ratio of the central processing unit 120 is lower than the predetermined lower limit. In some exemplary embodiments, the monitoring unit 140 may calculate the workload ratio of the central processing unit 120 based on the workload LD of the central processing unit 120, and then may provide the workload ratio of the central processing unit 120 to the clock signal management unit 150. Therefore, the clock signal management unit 150 may determine the operating frequency FCM to be applied to the central processing unit 120 (e.g., indicated as DET2). For example, when the workload ratio of the central processing unit 120 is between the predetermined lower limit and the predetermined upper limit, the clock signal management unit 150 may maintain the operating frequency FCM of the central processing unit 120. The workload ratio of the central processing unit 120 is lower than the predetermined lower limit, the clock signal management unit 150 may calculate a decreased operating frequency by decreasing the operating frequency FCM of the central processing unit 120 in a predetermined manner, and then may determine the operating frequency FCM to be applied to the central processing unit 120 as the decreased operating frequency. Next, the clock signal management unit 150 may apply the operating frequency FCM to the central processing unit 120. Here, since the operating frequency FCM of the central processing unit 120 is not increased, the clock signal management unit 150 might not output workload information of the central processing unit 120 at that timing point to the history buffer unit 160. The clock signal management unit 150 may output data NA indicating 'not-available' instead of the workload information of the central processing unit 120. Hence, the history buffer unit 160 may store the data NA indicating 'not-available' (e.g., indicated as STR). As described above, when the dynamic voltage and frequency scaling is performed on the central processing unit 120, the system on-chip 100 may maintain or decrease the operating frequency FCM of the central processing unit 120. For example, the system on-chip 100 might not allow for the previous peak workloads PLD stored in the history buffer unit 160 when maintaining or decreasing the operating frequency FCM of the central processing unit 120.

Figure 12:
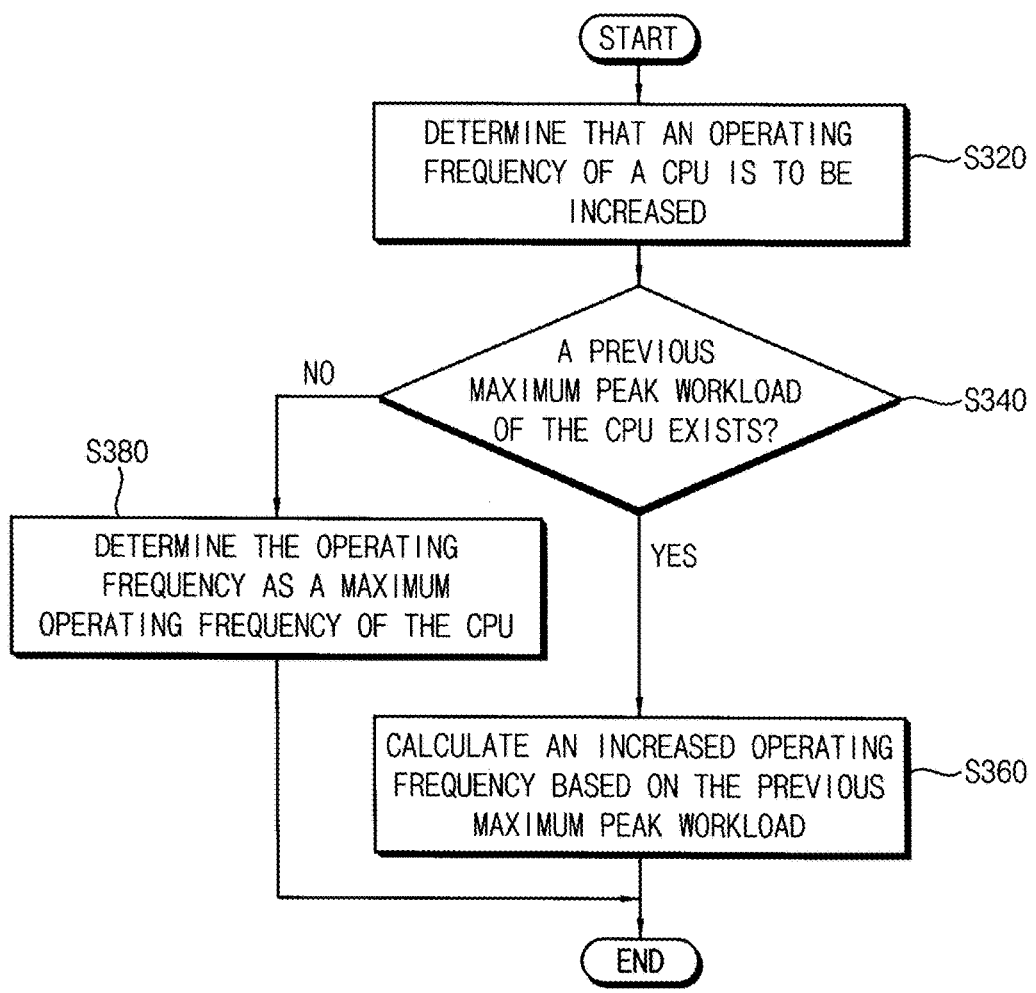
FIG. 12 is a flow chart illustrating an example in which an increased operating frequency is applied to a central processing unit included in the system on-chip of FIG. 6.
Figure 13:
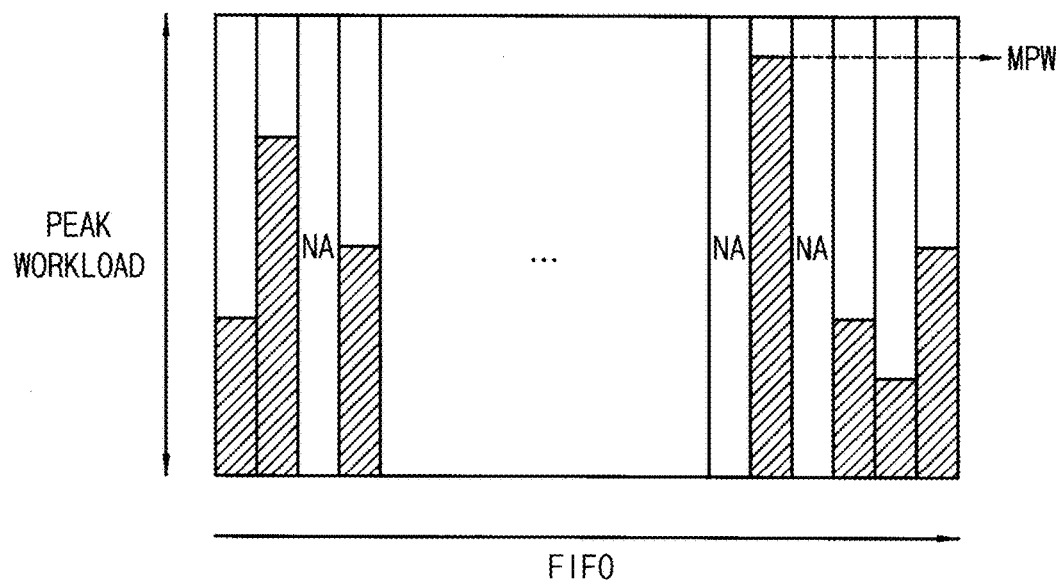
FIG. 13 is a diagram illustrating a state in which previous peak workloads of a central processing unit are stored in a history buffer unit included in the system on-chip of FIG. 6.
Figure 14:
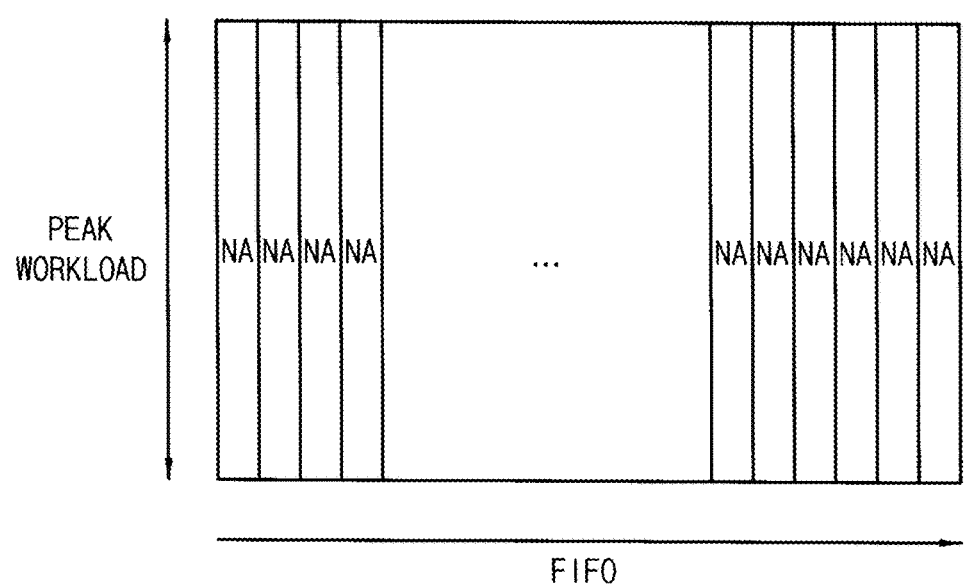
FIG. 14 is a diagram illustrating a state in which previous peak workloads of a central processing unit are not stored in a history buffer unit included in the system on-chip of FIG. 6.

FIG. 12 is a flow chart illustrating an example in which an increased operating frequency is applied to a central processing unit included in the system on-chip of FIG. 6. FIG. 13 is a diagram illustrating a state in which previous peak workloads of a central processing unit are stored in a history buffer unit included in the system on-chip of FIG. 6. FIG. 14 is a diagram illustrating a state in which previous peak workloads of a central processing unit are not stored in a history buffer unit included in the system on-chip of FIG. 6.

Referring to FIGS. 12 through 14, it is illustrated that the operating frequency FCM of the central processing unit 120 is increased as the dynamic voltage and frequency scaling is performed on the central processing unit 120. For example, when the system on-chip 100 determines that the operating frequency FCM of the central processing unit 120 is to be increased (S320), the system on-chip 100 may check whether the previous maximum peak workload BPLS of the central processing unit 120 exists in the history buffer unit 120 (S340). Here, when the previous maximum peak workload BPLS of the central processing unit 120 exists in the history buffer unit 120, the system on-chip 100 may calculate an increased operating frequency based on the previous maximum peak workload BPLS of the central processing unit 120 (S360), and may determine the operating frequency FCM of the central processing unit 120 as the increased operating frequency. When the previous maximum peak workload BPLS of the central processing unit 120 does not exist in the history buffer unit 120, the system on-chip 100 may determine the operating frequency FCM of the central processing unit 120 as the maximum operating frequency of the central processing unit 120 (S380). Subsequently, the system on-chip 100 may apply the increased operating frequency or the maximum operating frequency of the central processing unit 120 to the central processing unit 120.

As described above, the history buffer unit 160 may store the previous peak workloads PLD of the central processing unit 120 at previous timing points where the operating frequency FCM of the central processing unit 120 was increased, and may store the data NA indicating 'not-available' instead of the workload information of the central processing unit 120 at previous timing points where the operating frequency FCM of the central processing unit 120 was maintained or decreased. In an exemplary embodiment, the history buffer unit 160 may be implemented as a queue having a predetermined capacity. In addition, the history buffer unit 160 may operate in an FIFO manner. Here, since the history buffer unit 160 operates in the FIFO manner, as time goes on, new data (e.g., new previous peak workloads PLD of the central processing unit 120) may be included as candidates, and old data (e.g., old previous peak workloads PLD of the central processing unit 120) may be excluded from the candidates. As illustrated in FIGS. 13 and 14, as time goes on, the previous peak workloads PLD of the central processing unit 120 at previous timing points where the operating frequency FCM of the central processing unit 120 was increased and/or the data NA replacing the workload information of the central processing unit 120 at previous timing points where the operating frequency FCM of the central processing unit 120 was maintained or decreased may be sequentially stored in the slots SLOT of the history buffer unit 160. FIG. 13 shows a situation where the previous maximum peak workload BPLS of the central processing unit exists in the history buffer unit 120. A maximum value MPW of the previous peak workloads PLD of the central processing unit 120 at previous timing points where the operating frequency FCM of the central processing unit 120 was increased may be determined to be the previous maximum peak workload BPLS of the central processing unit 120. The history buffer unit 160 may output the maximum value MPW to the clock signal management unit 150 as the previous maximum peak workload BPLS of the central processing unit 120. FIG. 14 shows a situation where the previous maximum peak workload BPLS of the central processing unit 120 does not exist in the history buffer unit 120. The history buffer unit 160 may output a result signal NSR indicating that the previous maximum peak workload BPLS of the central processing unit 120 does not exist in the history buffer unit 120 to the clock signal management unit 150.

Figure 15:
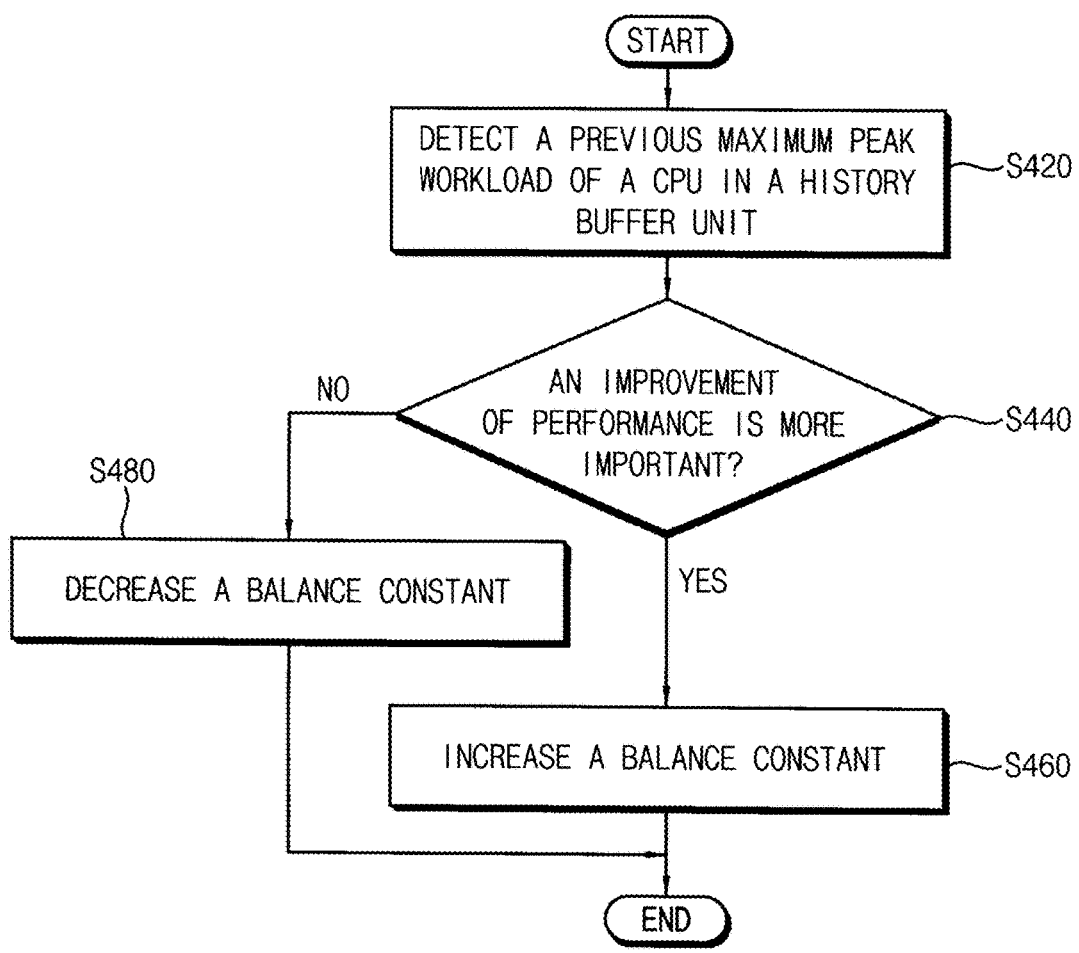
FIG. 15 is a flow chart illustrating an example in which an increased operating frequency to be applied to a central processing unit included in the system on-chip of FIG. 6 is calculated.
Figure 16:
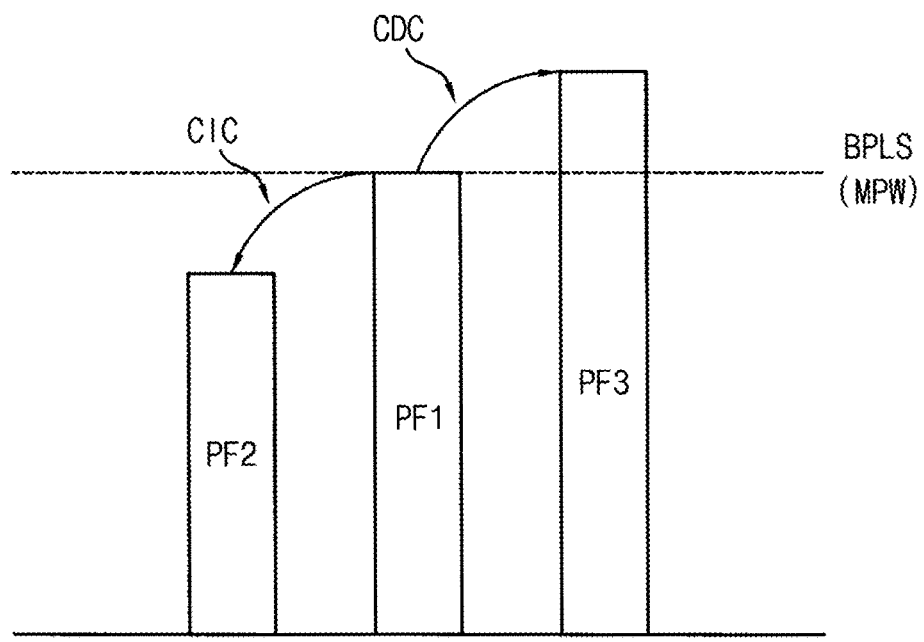
FIG. 16 is a diagram illustrating an example in which an increased operating frequency to be applied to a central processing unit included in the system on-chip of FIG. 6 is calculated.

FIG. 15 is a flow chart illustrating an example in which an increased operating frequency to be applied to a central processing unit included in the system on-chip of FIG. 6 is calculated. FIG. 16 is a diagram illustrating an example in which an increased operating frequency to be applied to a central processing unit included in the system on-chip of FIG. 6 is calculated.

Referring to FIGS. 15 and 16, it is illustrated that the increased operating frequency PF1, PF2, and FP3 to be applied to the central processing unit 120 is calculated. For example, the system on-chip 100 may detect the previous maximum peak workload BPLS of the central processing unit 120 in the history buffer unit 160 (S420), and may check whether an improvement of performance of the central processing unit 120 is more important than a reduction of power consumption of the central processing unit 120 for an entire system (e.g., an electronic device, a mobile device, etc) (S440). Here, when the improvement of the performance is more important than the reduction of the power consumption for the entire system, the system on-chip 100 may increase a balance constant C between the performance and the power consumption of the central processing unit 120 (S460). When the improvement of the performance is less important than the reduction of the power consumption for the entire system, the system on-chip 100 may decrease the balance constant C between the performance and the power consumption of the central processing unit 120 (S480). Next, the system on-chip 100 may calculate the increased operating frequency PF1, PF2, and PF3 to be applied to the central processing unit 120 using the balance constant C.

The system on-chip 100 may calculate the increased operating frequency PF1, PF2, and PF3 based on [Equation 1] above. As shown in [Equation 1] above, the increased operating frequency PF1 to be applied to the central processing unit 120 may become equal to the previous maximum peak workload BPLS of the central processing unit 120 if the balance constant C is 1. In addition, the increased operating frequency PF2 to be applied to the central processing unit 120 may become smaller than the previous maximum peak workload BPLS of the central processing unit 120 (e.g., indicated as CIC) if the balance constant C is smaller than 1. Further, the increased operating frequency PF3 to be applied to the central processing unit 120 may become greater than the previous maximum peak workload BPLS of the central processing unit 120 (e.g., indicated as CDC) if the balance constant C is greater than 1. Therefore, as illustrated in FIG. 16, the system on-chip 100 may basically set the balance constant C to be 1 in order to control the increased operating frequency PF1 to be equal to the previous maximum peak workload BPLS of the central processing unit 120. In addition, when the improvement of the performance is more important than the reduction of the power consumption in the entire system, the system on-chip 100 may increase the balance constant C in order to control the increased operating frequency PF3 to be greater than the previous maximum peak workload BPLS of the central processing unit 120 (e.g., indicated as CDC). Further, when the reduction of the power consumption is more important than the improvement of the performance in the entire system, the system on-chip 100 may decrease the balance constant C in order to control the increased operating frequency PF2 to be smaller than the previous maximum peak workload BPLS of the central processing unit 120 (e.g., indicated as CIC). As a result, the system on-chip 100 may adjust the increased operating frequency PF1, PF2, and PF3 to be applied to the central processing unit 120 according to required conditions for the entire system.

Figure 17:
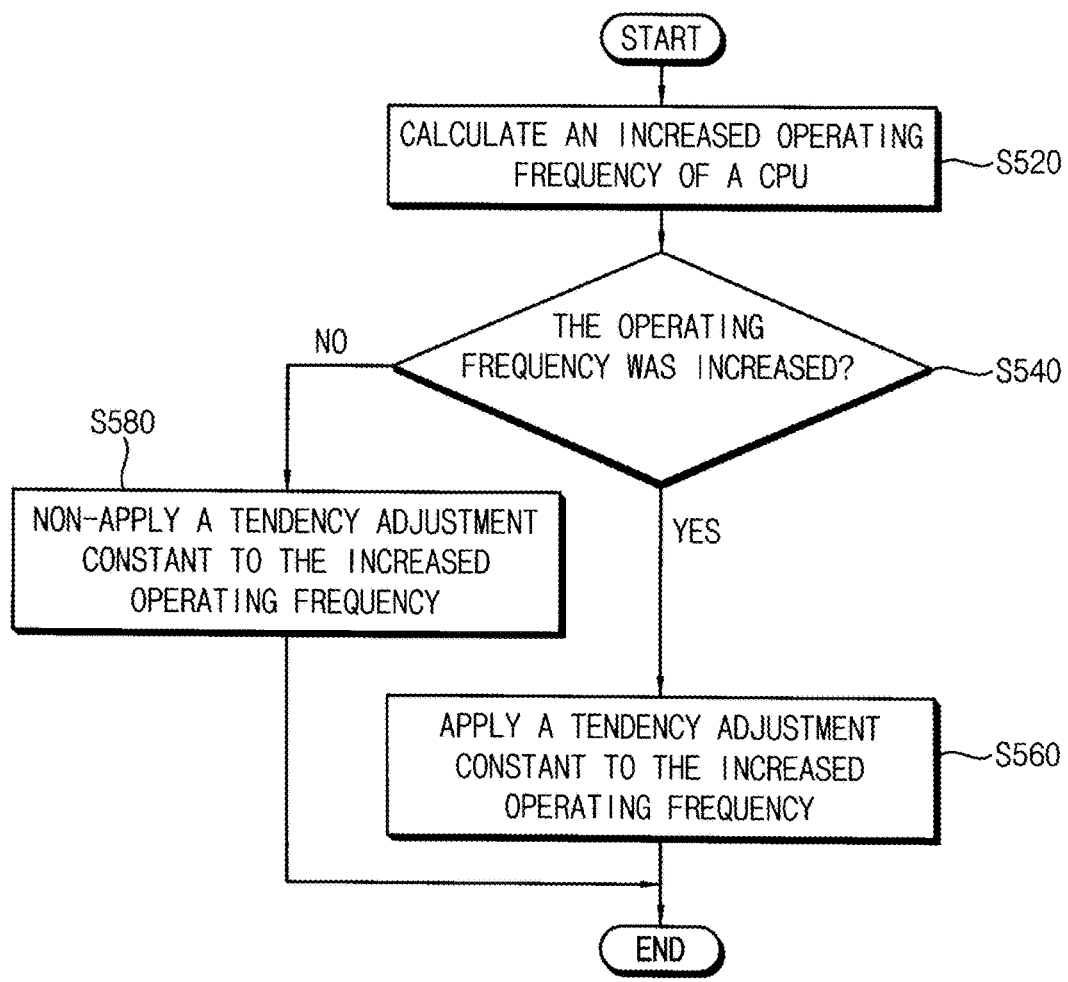
FIG. 17 is a flow chart illustrating an example in which an increased operating frequency to be applied to a central processing unit included in the system on-chip of FIG. 6 is adjusted.
Figure 18:
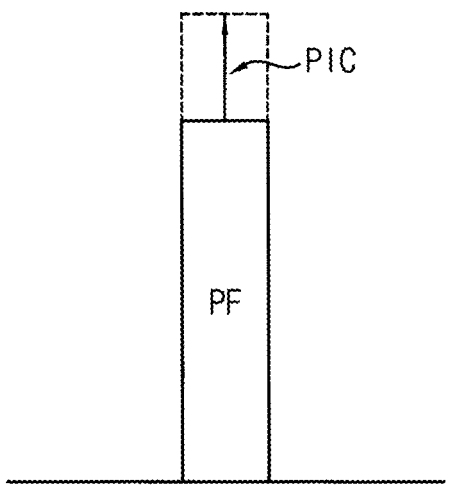
FIG. 18 is a diagram illustrating an example in which an increased operating frequency to be applied to a central processing unit included in the system on-chip of FIG. 6 is adjusted.

FIG. 17 is a flow chart illustrating an example in which an increased operating frequency to be applied to a central processing unit included in the system on-chip of FIG. 6 is adjusted. FIG. 18 is a diagram illustrating an example in which an increased operating frequency to be applied to a central processing unit included in the system on-chip of FIG. 6 is adjusted.

Referring to FIGS. 17 and 18, it is illustrated that the increased operating frequency PF to be applied to the central processing unit 120 is adjusted. For example, the system on-chip 100 may calculate the increased operating frequency PF of the central processing unit 120 (S520), and then may check whether the operating frequency FCM of the central processing unit 120 was increased by a previous dynamic voltage and frequency scaling that is just prior to a current dynamic voltage and frequency scaling (S540). Here, when the operating frequency FCM of the central processing unit 120 is increased by the previous dynamic voltage and frequency scaling, the system on-chip 100 may apply a tendency adjustment constant K to the increased operating frequency PF (S560). When the operating frequency FCM of the central processing unit 120 is not increased by the previous dynamic voltage and frequency scaling, the system on-chip 100 might not apply the tendency adjustment constant K to the increased operating frequency PF (S580). For example, when the operating frequency FCM of the central processing unit 120 tends to be continuously increased as the dynamic voltage and frequency scaling is performed on the central processing unit 120, the system on-chip 100 may adjust the increased operating frequency PF (e.g., indicated as PIC).

The system on-chip 100 may adjust the increased operating frequency PF using [Equation 2] above. As shown in [Equation 2] above, the increased operating frequency PF to be applied to the central processing unit 120 might not be adjusted if the tendency adjustment constant K is 1. The increased operating frequency PF to be applied to the central processing unit 120 may become equal to the previous maximum peak workload BPLS of the central processing unit 120. Here, since the tendency adjustment constant K is related to a tendency for increasing the operating frequency FCM of the central processing unit 120 as the dynamic voltage and frequency scaling is performed, the tendency adjustment constant K is basically set to be greater than 1. However, the present inventive concept does not exclude a case in which the tendency adjustment constant K is set to be smaller than 1. Thus, when the operating frequency FCM of the central processing unit 120 is increased by the previous dynamic voltage and frequency scaling, the system on-chip 100 may adjust the increased operating frequency PF to have a greater value (e.g., indicated as PIC). When the operating frequency FCM of the central processing unit 120 was increased by the previous dynamic voltage and frequency scaling, the operating frequency FCM of the central processing unit 120 is likely to be increased by the current dynamic voltage and frequency scaling (e.g., there is a high possibility that the operating frequency FCM of the central processing unit 120 is increased by the current dynamic voltage and frequency scaling). Thus, the system on-chip 100 may adjust the increased operating frequency PF to have a greater value by applying the tendency adjustment constant K to the increased operating frequency PF. However, the present inventive concept is not limited thereto. For example, a condition for applying the tendency adjustment constant K to the increased operating frequency PF may be determined in various ways.

Figure 19:
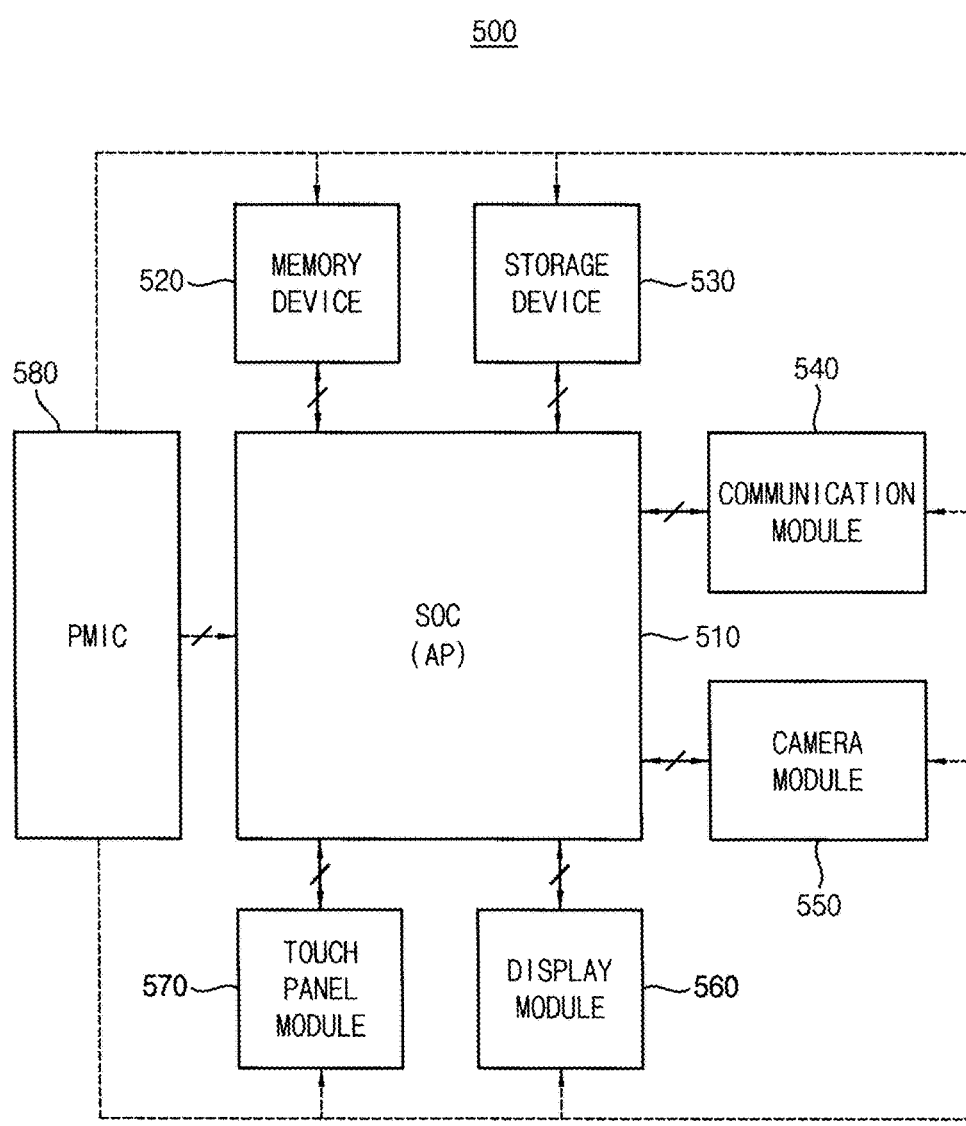
FIG. 19 is a block diagram illustrating a mobile device according to exemplary embodiments.
Figure 20:
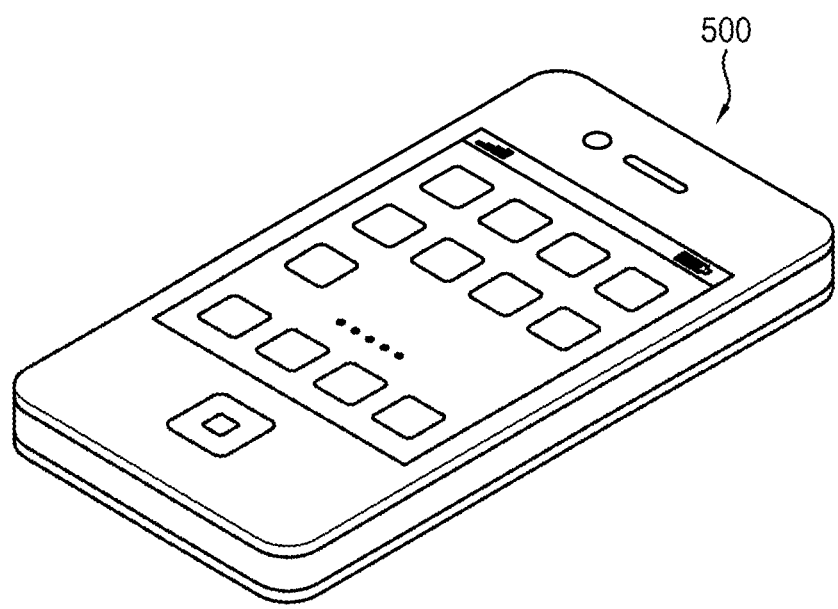
FIG. 20 is a diagram illustrating an example in which the mobile device of FIG. 19 is implemented as a smart-phone.

FIG. 19 is a block diagram illustrating a mobile device according to exemplary embodiments. FIG. 20 is a diagram illustrating an example in which the mobile device of FIG. 19 is implemented as a smart-phone.

Referring to FIGS. 19 and 20, the mobile device 500 may include a system on-chip 510, a memory device 520, a storage device 530, a plurality of function modules 540, 550, 560, and 570, and a power management integrated circuit 580. The power management integrated circuit 580 may provide an operating voltage to the system on-chip 510, the memory device 520, the storage device 530, and the function modules 540, 550, 560, and 570, respectively. As illustrated in FIG. 20, the mobile device 500 may be implemented as a smart-phone, and the system on-chip 510 may correspond to an application processor (AP). Hereinafter, it is assumed that the system on-chip 510 corresponds to the application processor. In addition, although it is illustrated in FIG. 19 that the power management integrated circuit 580 is placed outside the system on-chip 510, the power management integrated circuit 580 may be incorporated within the system on-chip 510.

The application processor 510 may control an overall operation of the mobile device 500. The application processor 510 may control the memory device 520, the storage device 530, and the function modules 540, 550, 560, and 570. Here, the application processor 510 may expect (e.g., predict) an operating state of a central processing unit (CPU) included in the application processor 510, and may perform a dynamic voltage and frequency scaling (e.g., increase, decrease, or maintain an operating frequency of the central processing unit) based on the anticipated operating state of the central processing unit. According to some exemplary embodiments, the dynamic voltage and frequency scaling may be performed by hardware or software. For example, the application processor 510 may calculate a workload ratio of the central processing unit by monitoring a workload of the central processing unit. On this basis, the application processor 510 may increase the operating frequency of the central processing unit when the workload ratio of the central processing unit is higher than a predetermined upper limit, may decrease the operating frequency of the central processing unit when the workload ratio of the central processing unit is lower than a predetermined lower limit, and maintain the operating frequency of the central processing unit when the workload ratio of the central processing unit is between the predetermined upper limit and the predetermined lower limit. In some exemplary embodiments, the monitoring unit 140 may calculate the workload ratio of the central processing unit 120 to provide the workload ratio of the central processing unit 120 to the clock signal management unit 150. For example, the application processor 510 may reduce unnecessary level of power consumption of the central processing unit while ensuring performance of the central processing unit by changing the operating frequency of the central processing unit based on a previous maximum peak workload of the central processing unit that exists in a history period of the dynamic voltage and frequency scaling that is performed on the central processing unit. For this operation, the application processor 510 may include at least one intellectual property unit, the central processing unit that operates based on a clock signal, a clock signal generating unit that generates the clock signal, a monitoring unit that monitors the workload of the central processing unit, a history buffer unit that stores previous peak workloads of the central processing unit at previous timing points where the operating frequency of the central processing unit was increased, and a clock signal management unit that performs the dynamic voltage and frequency scaling. Here, when the clock signal management unit increases the operating frequency of the central processing unit, the clock signal management unit may detect the previous maximum peak workload of the central processing unit in the history buffer unit, and may apply an increased operating frequency to the central processing unit, where the increased operating frequency is calculated based on the previous maximum peak workload of the central processing unit. As a result, the mobile device 500 may operate using low power, but may provide high performance. Since theses are described above, duplicated description will not be repeated.

The memory device 520 and the storage device 530 may store data for operations of the mobile device 500. In some exemplary embodiments, the memory device 520 and the storage device 530 may be included in the application processor 510. For example, the memory device 520 may include a volatile semiconductor memory device such as a dynamic random access memory (DRAM) device, a static random access memory (SRAM) device, a mobile DRAM, etc. In addition, the storage device 530 may include a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In some exemplary embodiments, the storage device 530 may further include a solid state drive (SSD), a hard disk drive (HDD), a CD-ROM, etc. However, the types of memory devices 520 and the storage devices 530 are not limited thereto.

In addition, the function modules 540, 550, 560, and 570 may perform various functions of the mobile device 500. For example, the mobile device 500 may include a communication module 540 that performs a communication function (e.g., code division multiple access (CDMA) module, long term evolution (LTE) module, radio frequency (RF) module, ultra wideband (UWB) module, wireless local area network (WLAN) module, worldwide interoperability for microwave access (WIMAX) module, etc), a camera module 550 that performs a camera function, a display module 560 that performs a display function, a touch panel module 570 that performs a touch-input sensing function, etc. In some exemplary embodiments, the mobile device 500 may further include a global positioning system (GPS) module, a microphone (MIC) module, a speaker module, various sensor modules (e.g., a gyroscope sensor, a geomagnetic sensor, an acceleration sensor, a gravity sensor, an illumination sensor, a proximity sensor, a digital compass, etc). However, kinds of the function modules 540, 550, 560, and 570 included in the mobile device 500 are not limited thereto. Although it is illustrated in FIGS. 19 and 20 that the system on-chip 510 is implemented as the application processor of the mobile device 500, it should be understood that the system on-chip 510 corresponds to any semiconductor integrated chip that includes a central processing unit on which a dynamic voltage and frequency scaling is performed.

The present inventive concept may be applied to an electronic device (e.g., a mobile device) that includes a system on-chip. For example, the present inventive concept may be applied to a computer, a laptop, a digital camera, a cellular phone, a smart-phone, a smart-pad, a personal digital assistants (PDA), a portable multimedia player (PMP), an MP3 player, a navigation system, a video camcorder, a portable game console, etc.

The foregoing is illustrative of exemplary embodiments and is not to be construed as limiting thereof. Although a few exemplary embodiments have been described, those skilled in the art will readily appreciate that many modifications are possible without materially departing from the novel teachings and aspects of the present inventive concept. Accordingly, all such modifications are intended to be included within the scope of the present inventive concept as defined in the claims.

What is claimed is:

1. A method of changing an operating frequency of a central processing unit included in a system on-chip, the method comprising:
   receiving history information including a history of dynamic voltage and frequency scaling over a predetermined history period;
   detecting a previous maximum peak workload of the central processing unit occurring when the operating frequency of the central processing unit has been increased from the history period of the received history information;
   calculating an increased operating frequency of the central processing unit based on the detected previous maximum peak workload; and
   setting the operating frequency of the central processing unit to the calculated increased operating frequency.

2. The method of claim 1, further comprising: applying a maximum operating frequency of the central processing unit to the central processing unit when the previous maximum peak workload of the central processing unit is not detected in the history period.

3. The method of claim 1, wherein the history period is between a first timing point and a second timing point, the second timing point being a timing point where the operating frequency of the central processing unit is determined to be increased, the first timing point being a timing point that is prior to the second timing point by a predetermined time.

4. The method of claim 3, wherein the operating frequency of the central processing unit is increased when a workload ratio of the central processing unit is higher than a predetermined upper limit, wherein the operating frequency of the central processing unit is decreased when the workload ratio of the central processing unit is lower than a predetermined lower limit, and wherein the operating frequency of the central processing unit is maintained when the workload ratio of the central processing unit is between the predetermined upper limit and the predetermined lower limit.

5. The method of claim 3, wherein a maximum value of previous peak workloads of the central processing unit is determined to be the previous maximum peak workload of the central processing unit when the previous peak workloads at previous timing points where the operating frequency of the central processing unit was increased are detected in the history period.

6. The method of claim 3, wherein the increased operating frequency is calculated by multiplying a balance constant between performance and power consumption of the central processing unit, and the previous maximum peak workload of the central processing unit.

7. The method of claim 6, wherein the increased operating frequency is adjusted by multiplying the increased operating frequency, and a tendency adjustment constant.

8. The method of claim 1, wherein the system on-chip corresponds to an application processor included in a mobile device.

9. A system on-chip comprising;
   at least one intellectual property unit;
   a central processing unit configured to operate based on a clock signal;
   a clock signal generating unit configured to generate the clock signal;
   a monitoring unit configured to monitor a workload of the central processing unit;
   a clock, signal management unit configured to increase an operating frequency of the central processing unit corresponding to a frequency of the clock signal when a workload ratio of the central processing unit is higher than a predetermined upper limit, to decrease the operating frequency of the central processing unit when the workload ratio of the central processing unit is lower than a predetermined lower limit, and to maintain the operating frequency of the central processing unit when the workload ratio of the central processing unit is between the predetermined upper limit and the predetermined lower limit; and
   a history buffer unit configured to store previous peak workload data of the central processing unit at previous timing points where the operating frequency of the central processing unit was increased,
   wherein the clock signal management unit detects a previous maximum peak workload of the central processing unit in the history buffer unit, and applies an increased operating frequency to the central processing unit when the clock signal management unit increases the operating frequency of the central processing unit, the increased operating frequency being calculated based on the previous maximum peak workload of the central processing unit.

10. The system on-chip of claim 9, wherein the clock signal management unit applies a maximum operating frequency of the central processing unit to the central processing unit when the previous maximum peak workload of the central processing unit is not detected in the history buffer unit.

11. The system on-chip of claim 9, wherein the history buffer unit is implemented as a queue having a predetermined capacity, and the history buffer unit operates a first-in first-out (FIFO) manner.

12. The system on-chip of claim 11, wherein the history buffer unit stores data indicating 'not-available' instead of workload information of the central processing unit at previous timing points where the operating frequency of the central processing unit was maintained or decreased.

13. The system on-chip of claim 9, wherein the increased operating frequency is calculated by multiplying a balance constant between performance and power consumption of the central processing unit, and the previous maximum peak workload of the central processing unit.

14. The system on-chip of claim 13, wherein the increased operating frequency is adjusted by multiplying the increased operating frequency, and a tendency adjustment constant.

15. The system on-chip of claim 9, wherein at least one of the clock signal generating unit, the monitoring unit, and the history buffer unit is included in the clock signal management unit.

16. A method for performing dynamic voltage and frequency scaling in a system-on-chip, comprising:
  collecting history information including a history of dynamic voltage and frequency scaling performed over a predetermined history period;
  attempting to identify a maximum peak workload occurring when the operating frequency of the system-on-chip has been increased from within the collected history information; and
  increasing the operating frequency of the system-on-chip based on the identifying a maximum peak workload when a maximum peak workload has been identified.

17. The method of claim 16, wherein the operating frequency of the system-on-chip is an operating frequency of a processor included within the system-on-chip.

18. The method of claim 16, further comprising applying a maximum. operating frequency to the system-on-chip when a maximum peak workload has not been identified.

19. The method of claim 16, wherein the predetermined history period is defined as predetermined length of time ending at a point in time where the operating frequency of the central processing unit is determined to be increased.

20. The method of claim 16, wherein the increased operating frequency is calculated based on a power consumption of the system-on-chip, and the previous maximum peak workload.

* * * * *